(12) United States Patent
Meador et al.

(10) Patent No.: US 9,109,088 B2
(45) Date of Patent: Aug. 18, 2015

(54) POROUS CROSS-LINKED POLYIMIDE NETWORKS

(71) Applicants: Ohio Aerospace Institute, Brook Park, OH (US); The United States of America as represented by the Administrator of the National Aeronautics and Space Administration, Washington, DC (US)

(72) Inventors: Mary Ann B. Meador, Strongsville, OH (US); Haiquan Guo, Avon, OH (US)

(73) Assignees: OHIO AEROSPACE INSTITUTE, Brook Park, OH (US); THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 338 days.

(21) Appl. No.: 13/756,855

(22) Filed: Feb. 1, 2013

(65) Prior Publication Data
US 2015/0141544 A1     May 21, 2015

Related U.S. Application Data

(60) Provisional application No. 61/594,657, filed on Feb. 3, 2012.

(51) Int. Cl.
    *C08G 73/10*         (2006.01)

(52) U.S. Cl.
    CPC ........ *C08G 73/1007* (2013.01); *C08G 73/1082* (2013.01); *C08J 2205/026* (2013.01); *C08J 2379/08* (2013.01)

(58) Field of Classification Search
    CPC ....... C08G 73/10; C08G 73/1082; C08J 9/28; C08J 2205/026; C08J 2379/08
    See application file for complete search history.

(56) References Cited

U.S. PATENT DOCUMENTS

| | | |
|---|---|---|
| 7,074,880 B2 | 7/2006 | Rhine et al. |
| 7,732,496 B1 | 6/2010 | Leventis et al. |
| 8,067,478 B1 | 11/2011 | Meador et al. |
| 8,394,492 B1 | 3/2013 | Leventis et al. |

FOREIGN PATENT DOCUMENTS

WO     2004/009673 A1     1/2004

OTHER PUBLICATIONS

Peter, J. et al., "Synthesis of hyperbranched copolyimides and their application as selective layers in composite membranes," Desalination, 2009, vol. 245, pp. 516-526.

Pierre, A.C. and Pajonk, G.M., "Chemistry of Aerogels and Their Applications," Chem. Rev., 2002, vol. 102, No. 11, pp. 4243-4265.

Randall, J.P. et al., "Tailoring Mechanical Properties of Aerogels for Aerospace Applications," ACS Applied Materials and Interfaces, Mar. 1, 2011, vol. 3, pp. 613-626.

Reichenauer, G. et al., "Relationship between pore size and the gas pressure dependence of the gaseous thermal conductivity," Colloids and Surfaces A: Physicochem. Eng. Aspects, 2007, vol. 300, pp. 204-210.

Reza, S. et al., "Aerocapture Inflatable Decelerator (AID) for Planetary Entry," 19th AIAA Aerodynamic Decelerator Systems Technology Conference and Seminar, May 21, 2007, Williamsburg, Virginia; American Institute of Aeronautics and Astronautics, Reston, Virginia, 2007, pp. 1-18.

Ritter, N. et al., "Intrinsically Microporous Poly(imide)s: Structure-Porosity Relationship Studied by Gas Sorption and X-ray Scattering," Macromolecules, Feb. 28, 2011, vol. 44, pp. 2025-2033.

Smith, B. P. et al., "A Historical Review of Inflatable Aerodynamic Decelerator Technology Development," IEEE Aerospace Conference, Mar. 6, 2010, Big Sky, Montana, Paper #1276, pp. 1-18.

Smith, B.P. et al., "Thermal, Structural, and Inflation Modeling of an Isotensoid Supersonic Inflatable Aerodynamic Decelerator," IEEE Aerospace Conference, Mar. 5, 2011, Big Sky, Montana, Paper #1312.

Strachota, A. et al., "Epoxy Networks Reinforced with Polyhedral Oligomeric Silsesquioxanes (POSS). Thermomechanical Properties," Macromolecules, 2004, vol. 37, No. 25, pp. 9457-9464.

Takeichi, T. and Stille, J.K., "Star and Linear Imide Oligomers Containing Reactive End Caps: Preparation and Thermal Properties," Macromolecules, Aug. 1986, vol. 19, No. 8, 2093-2102.

Tamaki, R. et al., "Octa(aminophenyl)silsesquioxane as a Nanoconstruction Site," J. Am. Chem. Soc., 2001, vol. 123, No. 49, pp. 12416-12417.

(Continued)

*Primary Examiner* — Irina S Zemel
(74) *Attorney, Agent, or Firm* — Pearne & Gordon LLP

(57) ABSTRACT

Porous cross-linked polyimide networks are provided. The networks comprise an anhydride end-capped polyamic acid oligomer. The oligomer (i) comprises a repeating unit of a dianhydride and a diamine and terminal anhydride groups, (ii) has an average degree of polymerization of 10 to 50, (iii) has been cross-linked via a cross-linking agent, comprising three or more amine groups, at a balanced stoichiometry of the amine groups to the terminal anhydride groups, and (iv) has been chemically imidized to yield the porous cross-linked polyimide network. Also provided are porous cross-linked polyimide aerogels comprising a cross-linked and imidized anhydride end-capped polyamic acid oligomer, wherein the oligomer comprises a repeating unit of a dianhydride and a diamine, and the aerogel has a density of 0.10 to 0.333 g/cm$^3$ and a Young's modulus of 1.7 to 102 MPa. Also provided are thin films comprising aerogels, and methods of making porous cross-linked polyimide networks.

39 Claims, 25 Drawing Sheets
(7 of 25 Drawing Sheet(s) Filed in Color)

(56) References Cited

OTHER PUBLICATIONS

Tamaki, R. et al., "A Polyimide Nanocomposite from Octa(aminophenyl)silsesquioxane," Chem. Mater., 2003, vol. 15, No. 3, pp. 793-797.

Tang, H.H. et al., "Thermal Performance of Space Suit Elements with Aerogel Insulation for Moon and Mars Exploration," International Conference on Environmental Systems, Jul. 17, 2006, Norfolk, Virginia, Paper No. 2006-01-2235, pp. 1-8.

Waddon, A.J. and Coughlin, E.B., "Crystal Structure of Polyhedral Oligomeric Silsequioxane (POSS) Nano-materials: A Study by X-ray Diffraction and Electron Microscopy," Chem. Mater., 2003, vol. 15, No. 24, pp. 4555-4561.

Wright, M.E. et al., "Synthesis and Thermal Curing of Aryl-Ethynyl-Terminated coPOSS Imide Oligomers: New Inorganic/Organic Hybrid Resins," Chem. Mater., 2003, vol. 15, No. 1, pp. 264-268.

Barton, T.J. et al., "Tailored Porous Materials," Chem. Mater., 1999, vol. 11, No. 10, pp. 2633-2656.

Boday, D.J. et al., "Strong, Low-Density Nanocomposites by Chemical Vapor Deposition and Polymerization of Cyanoacrylates on Aminated Silica Aerogels," ACS Applied Materials & Interfaces, 2009, vol. 1, No. 7, pp. 1364-1369.

Braun, R.D. and Manning, R.M., "Mars Exploration Entry, Descent, and Landing Challenges," Journal of Spacecraft and Rockets, Mar.-Apr. 2007, vol. 44, No. 2, pp. 310-323.

Brown, G.J. et al, "Inflatable Aerocapture Decelerators for Mars Oribters," 19th AIAA Aerodynamic Decelerator Systems Technology Conference and Seminar, May 21, 2007, Williamsburg, Virginia; American Institute of Aeronautics and Astronautics, Reston, Virginia, 2007, 2543, pp. 1-13.

Brunauer, S. et al., "Adsorption of Gases in Multimolecular Layers," J. Am. Chem. Soc., Feb. 1938, vol. 60, pp. 309-319.

Burchell, M.J. et al., "Capture of hypervelocity particles in aerogel: in ground laboratory and low earth orbit," Planetary and Space Science, 1999, vol. 47, pp. 189-204.

Capadona, L.A. et al., "Flexible, low-density polymer crosslinked silica aerogels," Polymer, 2006, vol. 47, pp. 5754-5761.

Chidambareswarapattar, C. et al., "One-step room-temperature synthesis of fibrous polyimide aerogels from anhydrides and isocyanates and conversion to isomorphic carbons," J. Mater. Chem., Nov. 2010, vol. 20, pp. 9666-9678.

Chuang, K.C. et al., "Rigid-Rod Polyimides Based on Noncoplanar 4,4'-Biphenyldiamines: A Review of Polymer Properties vs Configuration of Diamines," Macromolecules, 1997, vol. 30, No. 23, pp. 7183-7190.

Coburn, J.C. et al., "Relaxation Behavior of Polyimides Based on 2,2'-Disubstituted Benzidines," Macromolecules, 1995, vol. 28, No. 9, pp. 3253-3260.

Del Corso, J.A. et al., "Advanced High-Temperature Flexible TPS for Inflatable Aerodynamic Decelerators," 21st AIAA Aerodynamic Decelerator Systems Technology Conference and Seminar, May 23, 2011, Dublin, Ireland; American Institute of Aeronautics and Astronautics, Reston, Virginia, 2011, 2510, pp. 1-23.

Del Corso, J.A. et al., "Flexible Thermal Protection System Development for Hypersonic Inflatable Aerodynamic Decelerators," 9th International Planetary Probe Workshop, Jun. 16, 2012, Toulouse, France, pp. 1-11.

Dine-Hart, R.A. and Wright, W.W., "Effect of Structural Variations on the Thermo-oxidative Stability of Aromatic Polyimides," Die Makromolekulare Chemie, 1972, vol. 153, pp. 237-254.

Dudek, M.J. and Ponder, J.W., "Accurate Modeling of the Intramolecular Electrostatic Energy of Proteins," Journal of Computational Chemistry, 1995, vol. 16, No. 7, pp. 791-816.

Ehlers, G.F.L. and Soloski, E.J., "Thermogravimetric Analysis of Polymers in Air," Report No. AFML-TR-78-64, Aug. 1978, Air Force Materials Laboratory, Wright-Patterson Air Force Base, Ohio, pp. coverpage, i-iii, v, 1-110.

Gembarovic, J. and Taylor, R.E., "A Method for Thermal Diffusivity Determination of Thermal Insulators," Int J Thermophys, 2007, vol. 28, pp. 2164-2175.

Gross, J. and Fricke, J., "Scaling of Elastic Properties in Highly Porous Nanostructured Aerogels," NanoStructured Materials, 1995, vol. 6, pp. 905-908.

Guo, H. et al., "Polyimide Aerogels Cross-Linked through Amine Functionalized Polyoligomeric Silsesquioxane," ACS Applied Materials & Interfaces, Feb. 4, 2011, vol. 3, pp. 546-552.

Guo, H. et al., "Tailoring Properties of Cross-Linked Polyimide Aerogels for Better Moisture Resistance, Flexibility, and Strength," ACS Applied Materials & Interfaces, Sep. 6, 2012, vol. 4, pp. 5422-5429.

Hergenrother, P.M., "The Use, Design, Synthesis, and Properties of High Performance/High Temperature Polymers: an Overview," High Performance Polymers, 2003, vol. 15, pp. coverpage, 3-45.

Huang, J. et al., "Cubic silsesquioxane-polyimide nanocomposites with improved thermomechanical and dielectric properties," Acta Materialia, 2005, vol. 53, pp. 2395-2404.

Huang, J.-C. et al., "Polyimide/POSS nanocomposites: interfacial interaction, thermal properties and mechanical properties," Polymer, 2003, vol. 44, pp. 4491-4499.

Husing, N. and Schubert, U., "Aerogels—Airy Materials: Chemistry, Structure, and Properties," Angew. Chem. Int. Ed., 1998, vol. 37, pp. coverpage, 23-45.

Ilhan, U.F. et al., "Hydrophobic monolithic aerogels by nanocasting polystyrene on amine-modified silica," J. Mater. Chem., 2006, vol. 16, pp. 3046-3054.

Jones, S.M., "Aerogel: Space exploration applications," J Sol-Gel Sci Techn, 2006, vol. 40, pp. 351-357.

Katti, A. et al., "Chemical, Physical, and Mechanical Characterization of Isocyanate Cross-linked Amine-Modified Silica Aerogels," Chem. Mater., 2006, vol. 18, No. 2, pp. 285-296.

Kawagishi, K. et al., "Superior Nanoporous Polyimides via Supercritical $CO_2$ Drying of Jungle-Gym-Type Polyimide Gels," Macromolecular Rapid Communications, 2007, vol. 28, pp. 96-100.

Kim, Y.-H. et al., "Synthesis and Characterization of Highly Soluble and Oxygen Permeable New Polyimides Based on Twisted Biphenyl Dianhydride and Spirobifluorene Diamine," Macromolecules, 2005, vol. 38, No. 19, pp. 7950-7956.

Kinsman, D. et al., "Two-Step Synthesis of BAX for Environmentally Safe PMR-BAX Composites," 47th International SAMPE Symposium, May 12, 2002, Long Beach, California; Society for the Advancement of Material and Process Engineering, Covina, California, 2002, vol. 47, pp. 395-403.

Kistler, S.S. and Caldwell, A.G., "Thermal Conductivity of Silica Aerogel," Industrial and Engineering Chemistry, Jun. 1934, vol. 26, No. 6, pp. 658-662.

Lee, Y.-J. et al., "Low-dielectric, nanoporous polyimide films prepared from PEO-POSS nanoparticles," Polymer, 2005, vol. 46, pp. 10056-10065.

Leventis, N. et al., "Nanoengineering Strong Silica Aerogels," Nano Letters, 2002, vol. 2, No. 9, pp. 957-960.

Liu, Y. et al., "Thermal and Mechanical Properties of Phenylethynyl-Containing Imide Oligomers Based on Isomeric Biphenyltetracarboxylic Dianhydrides," High Performance Polymers, 2010, vol. 22, pp. 95-108.

Ma, H.-S. et al., "Mechanical structure-property relationship of aerogels," Journal of Non-Crystalline Solids, 2000, vol. 277, pp. 127-141.

Mather, P.T. et al., "Mechanical Relaxation and Microstructure of Poly(norbornyl-POSS) Copolymers," Macromolecules, 1999, vol. 32, No. 4, pp. 1194-1203.

Meador, M.A., "Recent Advances in the Development of Processable High-Temperature Polymers," Annu. Rev. Mater. Sci., 1998, vol. 28, pp. 599-630.

Meador, M.A.B. et al., "Effect of Branching on Rod-Coil Block Polyimides as Membrane Materials for Lithium Polymer Batteries," Chem. Mater., 2003, vol. 15, No. 15, pp. 3018-3025.

Meador, M.A.B. et al., "Cross-linking Amine-Modified Silica Aerogels with Epoxies: Mechanically Strong Lightweight Porous Materials," Chem. Mater., 2005, vol. 17, No. 5, pp. 1085-1098.

Meador, M.A.B. et al., "Structure-Property Relationships in Porous 3D Nanostructures as a Function of Preparation Conditions: Isocyanate Cross-Linked Silica Aerogels," Chem. Mater., 2007, vol. 19, No. 9, pp. 2247-2260.

(56) References Cited

OTHER PUBLICATIONS

Meador, M.A.B. et al., "Structure-Property Relationships in Porous 3D Nanostructures: Epoxy-Cross-Linked Silica Aerogels Produced Using Ethanol as the Solvent," ACS Applied Materials and Interfaces, 2009, vol. 1, No. 4, pp. 894-906.

Meador, M.A.B. et al., "Epoxy Reinforced Aerogels Made Using a Streamlined Process," ACS Applied Materials & Interfaces, Jun. 30, 2010, vol. 2, No. 7, pp. 2162-2168.

Meador, M.A.B. et al., "Synthesis and Properties of Nanoporous Polyimide Aerogels Having a Covalently Bonded Network Structure," Polymer Preprints, 2010, vol. 51, No. 1, pp. 265-266.

Meador, M.A.B. et al., "Mechanically Strong, Flexible Polyimide Aerogels Cross-Linked with Aromatic Triamine," ACS Applied Materials and Interfaces, Jan. 10, 2012, vol. 4, pp. 536-544.

Miller, S. et al., "Clay Nanocomposite/Aerogel Sandwich Structures for Cryotanks," Proceedings of the National Space and Missile Materials Symposium, Jun. 2005, Summerlin, Nevada, pp. 1-12.

Moner-Girona, M. et al., "Micromechanical properties of silica aerogels," Applied Physics Letters, Aug. 2, 1999, vol. 75, No. 5, pp. 653-655.

Moner-Girona, M. et al., "Mechanical properties of silica aerogels measured by microindentation: influence of sol-gel processing parameters and carbon addition," Journal of Non-Crystalline Solids, 2001, vol. 285, pp. 244-250.

Nguyen, B.N. et al., "Tailoring Elastic Properties of Silica Aerogels Cross-Linked with Polystyrene," ACS Applied Materials & Interfaces, 2009, vol. 1, No. 3, pp. 621-630.

Nguyen, B.N. et al., "Elastic Behavior of Methyltrimethoxysilane Based Aerogels Reinforced with Tri-Isocyanate," ACS Applied Materials & Interfaces, 2010, vol. 2, No. 5, pp. 1430-1443.

Parmenter, K.E. and Milstein, F., "Mechanical properties of silica aerogels," Journal of Non-Crystalline Solids, 1998, vol. 223, pp. 179-189.

Pekala, R.W. et al., "A Comparison of Mechanical Properties and Scaling Law Relationships for Silica Aerogels and Their Organic Counterparts," Materials Research Society Symposium W: Scaling in Disordered Materials, Boston, MA; MRS Proceedings, Aug. 1990, vol. 207, 197, pp. 1-6.

a)    b)

US 9,109,088 B2

POROUS CROSS-LINKED POLYIMIDE NETWORKS

CROSS-REFERENCE TO RELATED APPLICATIONS

This application claims the benefit of U.S. Provisional Application No. 61/594,657, filed Feb. 3, 2012, the entire disclosure of which is hereby incorporated herein by reference.

STATEMENT OF GOVERNMENT-SPONSORED RESEARCH

This invention was made with government support under Contract No. NNC07TA79T awarded by NASA. The government has certain rights in this invention.

FIELD OF THE INVENTION

The present invention relates generally to polyimide networks, and more particularly, to porous cross-linked polyimide networks

BACKGROUND OF THE INVENTION

Thermosetting polyimides are commercially available as uncured resins, stock shapes, thin sheets, laminates, and machines parts. Thermoplastic polyimides are very often called pseudothermoplastic. There are two general types of polyimides. One type, so-called linear polyimides, is made by combining imides into long chains. Aromatic heterocyclic polyimides are the other usual kind, where R' and R" are two carbon atoms of an aromatic ring. Examples of polyimide films include Apical, Kapton, UPILEX, VTEC PI, Norton TH and Kaptrex. Polyimides have been in mass production since 1955. Typical monomers include pyromellitic dianhydride and 4,4'-oxydianiline.

Lightweight, low density structures are desired for acoustic and thermal insulation for aerospace structures, habitats, and astronaut equipment and aeronautic applications. Aerogel is a manufactured material with the lowest bulk density of any known porous solid. It is derived from a gel in which the liquid component of the gel has been replaced with a gas. The result is an extremely low-density solid with several properties, most notably its effectiveness as a thermal insulator and its extremely low density. It is nicknamed frozen smoke, solid smoke, or blue smoke due to its translucent nature and the way light scatters in the material; however, it feels like expanded polystyrene to the touch. Aerogels are produced by extracting the liquid component of a gel through supercritical drying. This allows the liquid to be slowly drawn off without causing the solid matrix in the gel to collapse from capillary action, as would happen with conventional evaporation. The first aerogels were produced from silica gels.

Plain silica aerogels are brittle. Reinforcing the aerogel structure with polymer provides improvements in strength while maintaining low density and pore structure. Degradation of polymers used in cross-linking tends to limit use temperatures to below 150° C.

Polyimide aerogels can be fabricated from linear polyimides by allowing a low concentration polyimide/polyamic acid solution to gel, followed by heating to complete imidization and subsequent supercritical fluid extraction, as taught for example by Wendall, R., et al., WO/2004/009673, and Chidambareswarapattar, C., et. al., J. Mater. Chem. 2010, 20, 9666-9678. Polyimide aerogels prepared in this way from, for example, oxydianiline and pyrolimellitic dianhydride, have high surface areas, low density, low thermal conductivity, and good ductility. However, the gels shrink substantially, up to 40%, during supercritical fluid extraction.

Polyimide aerogels can also be synthesized by reaction of dianhydrides with di-isocyanates instead of diamines, as also reported by Chidambareswarapattar, C., et. al., J. Mater. Chem. 2010, 20, 9666-9678. This approach resulted in less shrinkage if gels were allowed to cure at room temperature, but results of thermogravimetric analyses of these aerogels revealed that imidization had not gone to completion.

Polyimide aerogels can also be synthesized by cross-linking anhydride end-capped polyamic acid oligomers via aromatic triamines, followed by thermal imidization, as taught for example by Kawagishi, K., et al., Macromol. Rapid Commun. 2007, 28, 96-100, and Meador, M. A. B., et al., Polym. Prepr. 2010, 51, 265-266. Unfortunately, the thermal imidization caused the gels to re-dissolve to some extent, suggesting hydrolysis of amic acid and disruption of the integrity of the polyimide aerogel network.

Accordingly, a need exists for improved porous cross-linked polyimide networks and methods of making such networks. A need also exists for porous cross-linked polyimide aerogels and thin films comprising porous cross-linked polyimide aerogels.

BRIEF SUMMARY OF THE INVENTION

A porous cross-linked polyimide network is provided. The network comprises an anhydride end-capped polyamic acid oligomer. The oligomer (i) comprises a repeating unit of a dianhydride and a diamine and terminal anhydride groups, (ii) has an average degree of polymerization of 10 to 50, (iii) has been cross-linked via a cross-linking agent, comprising three or more amine groups, at a balanced stoichiometry of the amine groups to the terminal anhydride groups, and (iv) has been chemically imidized to yield the porous cross-linked polyimide network.

Also provided is a method of making a porous cross-linked polyimide network. The method comprises polymerizing a dianhydride and a diamine in a solution to form an anhydride end-capped polyamic acid oligomer comprising terminal anhydrides groups and having an average degree of polymerization of 10 to 50. The method also comprises cross-linking the oligomer with a cross-linking agent, comprising three or more amine groups, at a balanced stoichiometry of the amine groups to the terminal anhydride groups. The method also comprises mixing an imidization catalyst into the solution, before phase separation occurs in the solution, to chemically imidize the cross-linked oligomer to form the network.

Also provided is a porous cross-linked polyimide aerogel. The aerogel comprises a cross-linked and imidized anhydride end-capped polyamic acid oligomer. The oligomer comprises a repeating unit of a dianhydride and a diamine. The aerogel has a density of 0.10 to 0.333 g/cm$^3$ and a Young's modulus of 1.7 to 102 MPa.

Also provided is a thin film comprising a porous cross-linked polyimide aerogel. The aerogel comprises a cross-linked and imidized anhydride end-capped polyamic acid oligomer. The oligomer comprises a repeating unit of a dianhydride and a diamine. The aerogel has a density of 0.10 to 0.333 g/cm$^3$ and a Young's modulus of 1.7 to 102 MPa.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
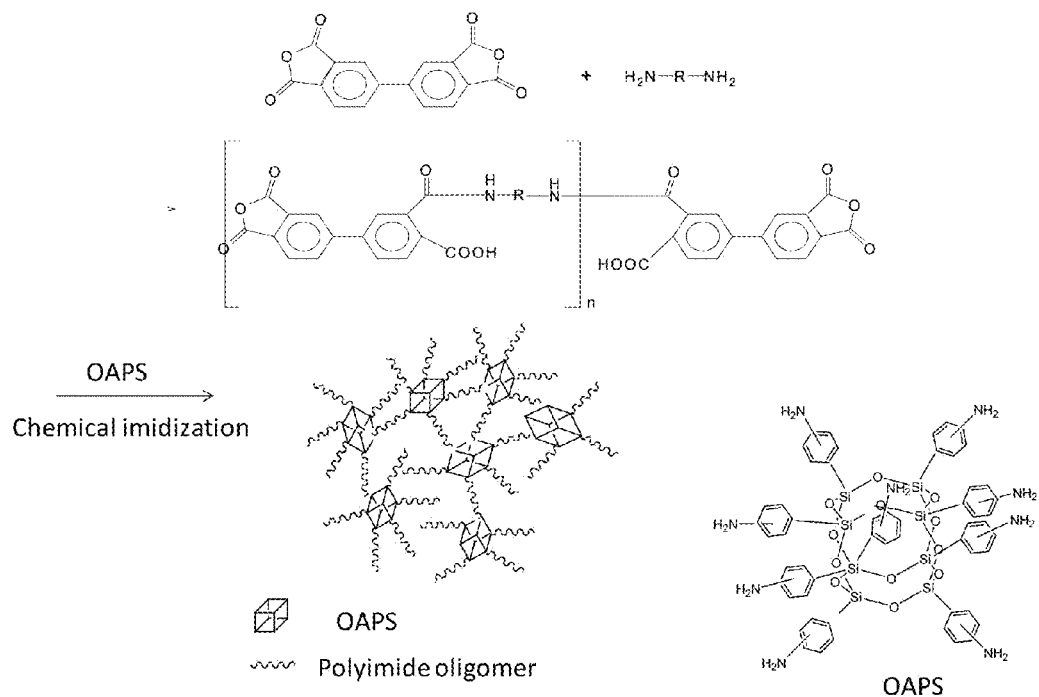
FIG. 1 is a scheme of synthesis of polyimide aerogels cross-linked with OAPS where n is the number of repeat units in oligomers of, for example, BPDA and BAX.

Described herein are porous cross-linked polyimide networks, and aerogels and thin films comprising the networks. A porous cross-linked polyimide network can be formed by cross-linking of an anhydride-end-capped polyamic acid oligomer in a solution by use of a multifunctional amine cross-linking agent, followed by chemical imidization of the cross-linked oligomer before separation of the cross-linked oligomer from the solution as a gel. Without wishing to be bound by theory it is believed that mixing an imidization catalyst into the solution soon after addition of the cross-linking agent, and before the solution phase separates, results in a homogeneous solution of cross-linked oligomer and imidization catalyst and ultimately a homogeneous porous cross-linked polyimide network, and that the resulting network provides polyimide aerogels with unexpectedly superior properties. Specifically, a wet gel comprising the porous cross-linked polyimide network can be made by carrying out this process in solution. An aerogel comprising the porous cross-linked polyimide network can be made by drying the wet gel, e.g. by supercritical $CO_2$ extraction. The resulting aerogels have low densities, e.g. about 0.1 to 0.3 g/cm$^3$, high porosities, e.g. 80 to 95% porous, high surface areas, e.g. about 200 to 600 m$^2$/g, and low thermal conductivities. e.g. as low as 14 mW/m–K at room temperature. The resulting aerogels also have higher Young's modulus than polymer-reinforced silica aerogels of similar densities and can be fabricated as both monoliths and thin films.

In one embodiment, a porous cross-linked polyimide network is provided. The network comprises an anhydride end-capped polyamic acid oligomer.

The oligomer comprises a repeating unit of a dianhydride and a diamine. A variety of dianhydrides and diamines can be used. For example, the dianhydride can be selected from the group consisting of benzophenone-3,3',4,4'-tetracarboxylic dianhydride ("BTDA") and biphenyl-3,3',4,4'-tetracarboxylic dianhydride ("BPDA"). Also for example, the diamine can be selected from the group consisting of 3,4-oxydianiline ("3,4-ODA"), 4,4'-oxydianiline ("4,4'-ODA" or "ODA"), p-phenylene diamine ("PPDA"), 2,2'-dimethylbenzidine ("DMBZ"), 4,4'-bis(4-aminophenoxy)biphenyl, 2,2'-bis[4-(4-aminophenoxyl)phenyl]propane, and bisaniline-p-xylidene ("BAX"). Additional suitable diamines include m-phenylenediamine, 4,4'-bis(aminophenoxy)-2,2'-dimethylbiphenyl ("BAPD"), 4,4'-[1,3-phenylenebis(1-methyl-ethylidene)]bisaniline (bisaniline-M), and 2,2-bis[4-(4-aminophenoxy)phenyl]hexafluoropropane ("HFBAPP"). The dianhydride and/or diamine can be selected based on being readily available, e.g. commercially available. The dianhydride and/or diamine can also be selected based on being known to impart different properties to polyimides in general, e.g. BPDA, PPDA, and DMBZ are known to produce a rigid backbone in polyimide structures, whereas ODA and BTDA have flexible linking groups between phenyl rings resulting in less rigid structures, although, as discussed in Example 2 below, the aerogels as disclosed herein can exhibit unexpected properties in this regard.

Two or more dianhydrides and/or two or more diamines can also be used in combination, as discussed with respect to diamines in particular in Example 3 below. For example, a diamine known to produce a rigid backbone in polyimide structures, such as PPDA or DMBZ, can be used in combination with a diamine having flexible linking groups between phenyl rings, such as ODA, to tailor properties of the resulting porous cross-linked polyimide network. Thus, for example, the diamine can comprise (i) ODA and (ii) PPDA or DMBZ. In accordance with this example, PPDA and ODA can be used in combination, such that the mole percent of PPDA can be varied from 0% to 100% of the total diamine, e.g. from 20% to 80%, 30% to 70%, 40% to 60%, or at about 50%, with the remaining diamine corresponding to ODA, e.g. from 80% to 20%, 70% to 30%, 60% to 40%, or at about 50%. Also in accordance with this example, DMBZ and ODA can be used in combination, such that the mole percent of DMBZ can be varied from 0% to 100% of the total diamine, e.g. from 20% to 80%, 30% to 70%, 40% to 60%, or at about 50%, with the remaining diamine corresponding to ODA, e.g. from 80% to 20%, 70% to 30%, 60% to 40%, or at about 50%.

The oligomer further comprises terminal anhydride groups, i.e. both ends of the oligomer comprise a terminal anhydride group.

The oligomer has an average degree of polymerization of 10 to 50. For example, the average degree of polymerization can be 15 to 40, or 20 to 30.

The oligomer has been cross-linked via a cross-linking agent. By this it is meant that molecules of oligomer have been cross-linked to each other via the cross-linking agent.

The cross-linking agent comprises three or more amine groups. For example, the cross-linking agent can be selected from the group consisting of a triamine, an aliphatic amine comprising three or more amines, an aliphatic triamine, an aromatic amine comprising three or more amine groups, an aromatic triamine, 1,3,5-tri(aminophenoxy)benzene ("TAB"), a silica cage structure (otherwise known as a silsesquioxane cage structure) decorated with three or more amines, octa(aminophenyl)silsesquioxane ("OAPS"), octa(aminophenyl)silsesquioxane as a mixture of isomers having the ratio meta:ortho:para of 60:30:10, and para-octa(aminophenyl)silsesquioxane ("p-OAPS").

The cross-linking is carried out at a balanced stoichiometry of the amine groups of the cross-linking agent to the terminal anhydrides of the oligomer. For example, for a cross-linking agent comprising three amine groups, such as 1,3,5-tri(aminophenoxy)benzene, the molar ratio of the cross-linking agent to the oligomer would be 2:3. Also for example, for a cross-linking agent comprising eight amine groups, such as octa(aminophenyl)silsesquioxane, the molar ratio of the cross-linking agent to the oligomer would be 1:4. As one of ordinary skill in the art will appreciate, carrying out the cross-linking at a balanced stoichiometry provides a cross-linked gel. This is in contrast to an imbalanced stoichiometry, which provides comb polymers that probably would not gel. Accordingly, as one of ordinary skill will also appreciate, a balanced stoichiometry need not be precisely balanced with respect to the molar ratio, but rather can tolerate some variation, e.g. plus or minus 10%, so long as the cross-linking provides a cross-linked gel.

The oligomer has been chemically imidized to yield the porous cross-linked polyimide network. The chemical imidization can be carried out, for example, by use of an imidization catalyst. The imidization catalyst can be selected, for example, from the group consisting of 1,4-diazabicyclo[2.2.2]-octane ("DABCO"), triethylamine, and pyridine. The oligomer can be chemically imidized to completion, e.g. all of the amic acid groups of each repeating unit of the oligomer can have reacted, e.g. intra-molecularly, to yield imide units. The oligomer can also be chemically imidized without using thermal imidization, e.g. without using an increase in temperature during imidization in order to increase the rate of imidization. The oligomer can be chemically imidized in a homogenous solution of imidization catalyst and oligomer, e.g. based on mixing of the imidization catalyst into a solution including the oligomer and the cross-linking agent before phase separation occurs in the solution, i.e. before cross-linking of the oligomer occurs to a sufficient extent such that a gel of the cross-linked oligomer separates from the solution phase.

In accordance with the above-noted embodiment, also provided is a wet gel comprising the porous cross-linked polyimide network. Along with the network, the wet gel can comprise a solvent that was used for preparation of the network. Solvents that can be used for preparation of the network include, for example, N-methyl-2-pyrrolidinone ("NMP"), dimethylformamide ("DMF"), and dimethylacetamide ("DMAc").

Alternatively or additionally, the wet gel can comprise a solvent used to remove the solvent that was used for preparation of the network. Such solvents include, for example, acetone.

In accordance with the above-noted embodiment, also provided is an aerogel comprising the porous cross-linked polyimide network. The aerogel can be obtained, for example, by supercritical fluid extraction, e.g. supercritical $CO_2$ extraction. The aerogel can have a low density, e.g. about 0.1 to 0.3 g/cm$^3$, 0.10 to 0.333 g/cm$^3$, 0.13 to 0.33 g/cm$^3$, 0.09 to 0.12 g/cm$^3$, or about 0.1 g/cm$^3$. The aerogel can have a high porosity, e.g. a porosity of 80 to 95%, or 91 to 94%. The aerogel can have a peak pore diameter of 5 to 60 nm, e.g. 25 to 40 nm. The aerogel can have a high surface area, e.g. a BET surface area of 200 to 600 m$^2$/g, 230 to 280 m$^2$/g, or 240-260 m$^2$/g. The aerogel can have a low thermal conductivity, e.g. a thermal conductivity of 13 to 16 mw/(m–K) at room temperature and 760 Torr. The aerogel can have a Young's modulus of 0.9 to 102 MPa, e.g. 1.7 to 102 MPa, 1.7 to 5.3 MPa, 2 to 5 MPa, or 15 to 102 MPa. The aerogel can have a Young's modulus that is higher than that of a polymer reinforced silica aerogel of similar density. The aerogel can have a glass transition temperature of at least 270° C., e.g. at least 280° C., at least 290° C., at least 300° C., at least 310° C., at least 320° C., at least 330° C., at least 340° C., or of 270° C. to 350° C. The aerogel can have an onset of decomposition of at least 460° C., e.g. at least 500° C., at least 550° C., at least 600° C., or of 460° C. to 610° C. The weight loss of the aerogel following heating of the network at 400° C. for 24 hours can be less than 5%, e.g. less than 2.5%, or less than 1%.

In accordance with the above-noted embodiment, also provided is a monolith comprising the porous cross-linked polyimide network. The monolith can be 2 to 5 times stronger than a monolith of a polymer reinforced silica aerogel of similar density.

In accordance with the above-noted embodiment, also provided is a thin film comprising the porous cross-linked polyimide network. The average degree of polymerization of the oligomer of the network can be, for example, 20 to 30. The thin film can have sufficient flexibility to be rolled or folded and then recover completely without cracking or flaking. The thin film can have a tensile strength of, for example, 4-9 MPa.

In accordance with the above-noted embodiment, also provided is a coating comprising the porous cross-linked polyimide network. The coating can be, for example, an aerogel comprising the porous cross-linked polyimide network, wherein the aerogel has been dried to a surface.

In accordance with the above-noted embodiment, also provided is a matting comprising the porous cross-linked polyimide network. For example, an aerogel comprising the porous cross-linked polyimide network can be cast into a woven or non-woven matting.

In another embodiment, a method of making a porous cross-linked polyimide network is provided. The method comprises polymerizing a dianhydride and a diamine in a solution to form an anhydride end-capped polyamic acid oligomer comprising terminal anhydrides and having an average degree of polymerization of 10 to 50, as discussed above.

The method also comprises cross-linking the oligomer with a cross-linking agent, comprising three or more amine groups, at a balanced stoichiometry of the amine groups to the terminal anhydride groups, as discussed above.

The method also comprises mixing an imidization catalyst into the solution, before phase separation occurs in the solution, to chemically imidize the cross-linked oligomer to form the network. Again, the imidization catalyst can be selected from the group consisting of 1,4-diazabicyclo[2.2.2]-octane, triethylamine, and pyridine. The oligomer can be chemically imidized to completion. The oligomer can be chemically imidized without using thermal imidization. The mixing of the imidization catalyst into the solution can result in a homogeneous distribution of the imidization catalyst in the solution. As noted, the mixing of the imidization catalyst into the solution is carried out before phase separation occurs in the solution. A water-scavenging agent, e.g. acetic anhydride, also can be mixed into the solution to scavenge water by-product of condensation.

The sum of the concentrations of the dianhydride, the diamine, and the cross-linking agent dissolved into the solution can be 5 to 20 w/w % of the solution, e.g. 7.5 to 15 w/w %, or 9 to 11 w/w %. The solution can comprise a solvent selected from the group consisting of N-methyl-2-pyrrolidinone, dimethylformamide, and dimethylacetamide.

In accordance with this embodiment, also provided is a porous cross-linked polyimide network formed by the above-described method, including the disclosed variations thereof. Also provided are a wet gel, an aerogel, a monolith, a thin film, a coating, and a matting, each comprising the network.

In another embodiment, a porous cross-linked polyimide aerogel is provided. The aerogel comprises a cross-linked and imidized anhydride end-capped polyamic acid oligomer, as described above. The oligomer comprises a repeating unit of a dianhydride and a diamine, also as described above. The aerogel has a density of 0.10 to 0.333 g/cm$^3$ and a Young's modulus of 1.7 to 102 MPa, also as described above.

In an example of the porous cross-linked polyimide aerogel, the dianhydride is biphenyl-3,3',4,4'-tetracarboxylic dianhydride, the diamine is bisaniline-p-xylidene, the density is 0.09 to 0.12 g/cm$^3$, and the Young's modulus is 1.7 to 5.3 MPa.

In another example of the porous cross-linked polyimide aerogel, the dianhydride is benzophenone-3,3',4,4'-tetracarboxylic dianhydride, the diamine is 2,2'-dimethylbenzidine, the density is 0.10 to 0.20 g/cm$^3$, and the Young's modulus is 15 to 102 MPa.

In another example of the porous cross-linked polyimide aerogel, the aerogel has a porosity of 80 to 95%, as described above.

In another example of the porous cross-linked polyimide aerogel, the aerogel has a peak pore diameter of 5 to 60 nm, as described above.

In another example of the porous cross-linked polyimide aerogel, the aerogel has a BET surface area of 200 to 600 m$^2$/g, as described above.

In another example of the porous cross-linked polyimide aerogel, the aerogel has a thermal conductivity of 13 to 16 mw/(m–K) at room temperature and 760 Torr, as described above.

In another example of the porous cross-linked polyimide aerogel, the aerogel has a glass transition temperature of at least 270° C. and an onset of decomposition of at least 460° C., as described above.

In another example of the porous cross-linked polyimide aerogel, the weight loss of the aerogel following heating of the network at 400° C. for 24 hours is less than 5%, as described above.

In another embodiment, a thin film comprising a porous cross-linked polyimide aerogel is provided. The aerogel comprises a cross-linked and imidized anhydride end-capped polyamic acid oligomer, as described above. The oligomer comprises a repeating unit of a dianhydride and a diamine, also as described above. The aerogel has a density of 0.10 to 0.333 g/cm$^3$ and a Young's modulus of 1.7 to 102 MPa, also as described above.

In an example of the thin film comprising a porous cross-linked polyimide aerogel, the thin film has sufficient flexibility to be rolled or folded and then recover completely without cracking or flaking.

In another example of the thin film comprising a porous cross-linked polyimide aerogel, the thin film has a tensile strength of 4-9 MPa.

EXAMPLE 1

Experimental Section

Materials. BPDA was purchased from Chriskev, Inc., (13920 W 108th Street, Lenexa, Kans., 66215, USA). BAX was obtained from Maverick, Inc., (11379 Grooms Road, Cincinnati, Ohio 45242-14050). OAPS as a mixture of isomers (meta:ortho:para=60:30:10) was acquired from Gelest, Inc. An all para-isomer, p-OAPS was purchased from Hybrid Plastic, Inc. HPLC grade N-methyl-2-pyrrolidinone (NMP) and pyridine were purchased from Sigma-Aldrich. Anhydrous acetic anhydride was purchased from Fisher Scientific. All reagents were used without further purification.

General. Attenuated total reflectance (ATR) infrared spectroscopy was conducted using a Nicolet Nexus 470 FT-IR spectrometer. Solid $^{13}$C NMR spectroscopy was carried out with a Bruker Avance-300 spectrometer, using cross-polarization and magic angle spinning at 11 kHz. The solid $^{13}$C spectra were externally referenced to the carbonyl of glycine (176.1 relative to tetramethylsilane, TMS). Scanning electron micrographs were obtained using a Hitachi S-4700 Field Emission Microscope after sputter coating the samples with gold. The samples were out-gassed at 80° C. for 8 h under vacuum before running nitrogen-adsorption porosimetry with an ASAP 2000 Surface Area/Pore Distribution Analyzer (Micromeritics Instrument Corp.). The skeletal density was measured using a Micromeritics Accupyc 1340 Helium Pycnometer. Thermal gravimetric analysis (TGA) was performed using a TA model 2950 HiRes instrument. Samples were run at a temperature ramp rate of 10° C. per min from room temperature to 750° C. under nitrogen or air.

Preparation of OAPS Cross-Linked Polyimide Aerogel Monoliths. Polyamic acid oligomer was formulated in NMP using a molar ratio of BPDA:BAX of (n+1):n, where n is the number of repeat units in the oligomers capped with anhydride as shown in the scheme in FIG. 1. Because each OAPS contains eight amine groups that can react with polyamic acid oligomers, a ratio of four oligomers to one OAPS was used. The total weight of precursors in solution was formulated to be 10 w/w % in all cases. A sample procedure for n=25 oligomer is as follows: To a solution of BAX (1.204 g, 4.18 mmol) in 19 mL of NMP was added BPDA (1.278 g, 4.34 mmol). The mixture was stirred until all BPDA was dissolved, after which a solution of OAPS (0.0481 g, 0.042 mmol) in 3.15 mL of NMP was added. The resulting solution was stirred for 10 min, after which acetic anhydride (3.275 mL, 34.7 mmol) and then pyridine (2.81 mL, 34.7 mmol) were added, both representing an eight to one ratio of acetic anhydride to BPDA. The sol solution was continually stirred for 10 min and then poured into a 20 mL syringe mold (2 cm in diameter), prepared by cutting off the needle end of the syringe and extending the plunger all the way out. Gelation took place within 60 min. The gel was aged in the mold for one day before extracting into NMP where it soaked for 24 h to remove acetic acid and pyridine. The solvent within the gels was then gradually exchanged to acetone in 24 h intervals starting with 75% NMP in acetone, followed by 25% NMP in acetone and finally 100% acetone. The gels were then placed in a 1 L supercritical fluid extraction chamber in acetone, and washed with liquid $CO_2$ at ~100 Bar and ~25° C. in four two-hour cycles. The chamber was then heated to 45° C. and the CO2 was converted into a supercritical state. Gaseous $CO_2$ was slowly vented out at the rate 4.5 m/h from the chamber over three hours. The dry polyimide aerogels produced in this way have a density of 0.108 g/cm$^3$ and porosity of 92%. $^{13}$C CP-MAS NMR δ 40, 126, 138, 165; FTIR: 1775 (m), 1715 (s), 1510 (m), 1370 (s) cm$^{-1}$.

Procedure to Make Polyimide Aerogel Films. The same OAPS cross-linked polyamic acid solution as described above was poured into a 6 inch wide Doctor blade with 0.762 mm gap, and cast onto a Kapton carrier film at a speed of 20 cm/min. The film which gelled within sixty minutes was peeled away from the Kapton under acetone. Afterwards, the films were washed in 24 h intervals in 75% NMP in acetone, followed by 25% NMP in acetone and finally washed three more times with acetone. Supercritical drying was carried out as described before to give polyimide aerogel thin films with similar properties to above.

Mechanical Characterization. The specimens were cut and polished to make sure that the top and bottom surfaces were smooth and parallel. The diameter and length of the specimens were measured before testing. ASTM standard D695-02a (Compressive Properties of Rigid Plastics) was used as the guideline for this series of testing. Because of the rapid rate of buckling seen in aerogels, the sample lengths were smaller than the ASTM standard (varying between lengths of 0.5 and 1.0 inches). Samples were conditioned at room temperature for 48 h prior to testing. The samples were tested between a pair of compression plates on a Model 4505 Instron load frame using Series IX data acquisition software. All testing was done at nominal room conditions, and at a separation rate of 0.05 in/min as dictated by the ASTM guidelines. The Young's modulus was taken as the initial slope from the stress-strain curve of the compression.

Thermal Physical Property Testing of Polyimide Aerogel Film. The thin films were measured at the Thermophysical Properties Research Lab, Inc., located at 3080 Kent Avenue, West Lafayette, Ind. 47906. The step heating (3P) method was used which involves subjecting one face of a specimen to a uniform heat flux and recording the temperature responses at various locations, in accordance with Gembarovic, J.; Taylor, R. E. Int. J. Thermophys. 2007, 28, 2164-2175. A 60 W light bulb, mounted within an aluminum parabolic reflector, is the heat flux source. Temperature rise curves are measured at three locations using K-type thermocouples spaced along the sample. The two outside locations (one on each end) are used as boundary conditions and interior position data are used as the basis for the diffusivity calculations. Specific heat is measured using a standard Perkin-Elmer Model DSC-2 Differential Scanning calorimeter with sapphire as the reference material (ASTM E1269). The standard and sample were subjected to the same heat flow as a blank and the differential powers required to heat the sample and standard at the same rate were determined using the digital data acquisition system. From the masses of the sapphire standard and sample, the differential power, and the known specific heat of sapphire, the specific heat of the sample is computed. All measured quantities are directly traceable to NIST standards. Before the diffusivity measurement, the samples were kept in vacuum chamber for at least 20 min in order to dry the sample material. The chamber was then flushed twice and finally filled with dry nitrogen gas at normal pressure p=760 Torr.

The sample temperature was measured using three K-type thermocouples (4 mils wire thickness) welded separately to thin stainless steel foils of dimensions 8 mm×8 mm×0.062 mm, with oxidized surfaces. Test specimens consisted of four layers of polyimide aerogel thin films. No opacifiers were used. The composite specimen used for the diffusivity measurement had a average bulk density $\rho_b$=0.121 g/cm$^3$, 5 cm diameter, thickness of 0.3759 cm, and mass of 0.8915 g. Total relative expanded uncertainty (coverage factor k=2) of the density measurement is ±3%. Total relative expanded uncertainty (k=2) of the specific heat measurement is ±3%.

Results and Discussion

Figure 2:
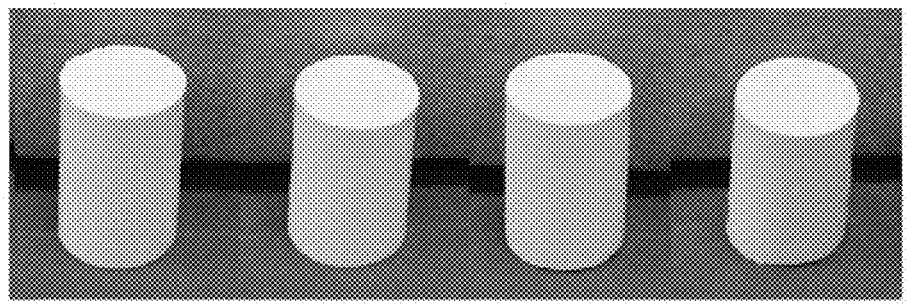
FIG. 2 shows OAPS cross-linked polyimide aerogels made from, left to right, n=25, n=20, n=15, and n=10 oligomers.

Polyimide aerogels were made using 10 w/w % solution of OAPS, BPDA and BAX, in NMP, with the formulated number of repeat units, n, ranging from 10 to 25. Amber colored polyamic acid oligomers with terminal anhydride groups are formed in solution from (n+1) equivalents of BPDA and n equivalents of BAX upon mixing, as shown in the scheme in FIG. 1. The terminal anhydride groups react with the amines of OAPS, after which pyridine (to catalyze imidization) and acetic anhydride (to scavenge water byproduct of condensation) are added to the solution. Gelation occurs in 30 minutes to one hour, with longer oligomers requiring the longest gel time. All of the samples from the study are light yellow and opaque as shown in FIG. 2 for n=25 samples. Shrinkage of the aerogels during fabrication is minimal, ranging from 11-13%, measured as the difference between the diameter of the mold and the dried samples.

As reported by Laine et al., as referenced in Meador, M. A. B. et al., Polym. Prepr. 2010, 51, 265-266, $^{29}$Si NMR of OAPS in solution contains two peaks at −73.3 and −77.4 ppm. Solid $^{29}$Si NMR of the polyimide aerogels fabricated in this study show a broad resonance at −75 ppm, characteristic of the polysilsesquioxane structure. Solid $^{13}$C NMR spectra of the aerogels have the expected broad peaks 40 ppm (methylenes from BAX), 126 ppm and 138 ppm (aromatic carbons), and 165 ppm (imide carbonyl). FTIR spectra also contain characteristic bands for polyimide at 1370 cm$^{-1}$ (ν imide C—N), 1715 cm$^{-1}$ (symmetric ν imide C=O) and 1775 cm$^{-1}$ (asymmetric ν imide C=O). A band at ~1860 cm$^{-1}$, which would indicate the existence of unreacted anhydride, is not observed. In addition, bands at ~1660 cm$^{-1}$ (ν amic acid C=O) and ~1535 cm$^{-1}$ (ν amide C—N) are absent, further indicating that imidization is complete. Bands at ~1807 and 980 cm$^{-1}$ expected for the isoimide structure also are not observed in the FTIR spectra.

Figure 3:
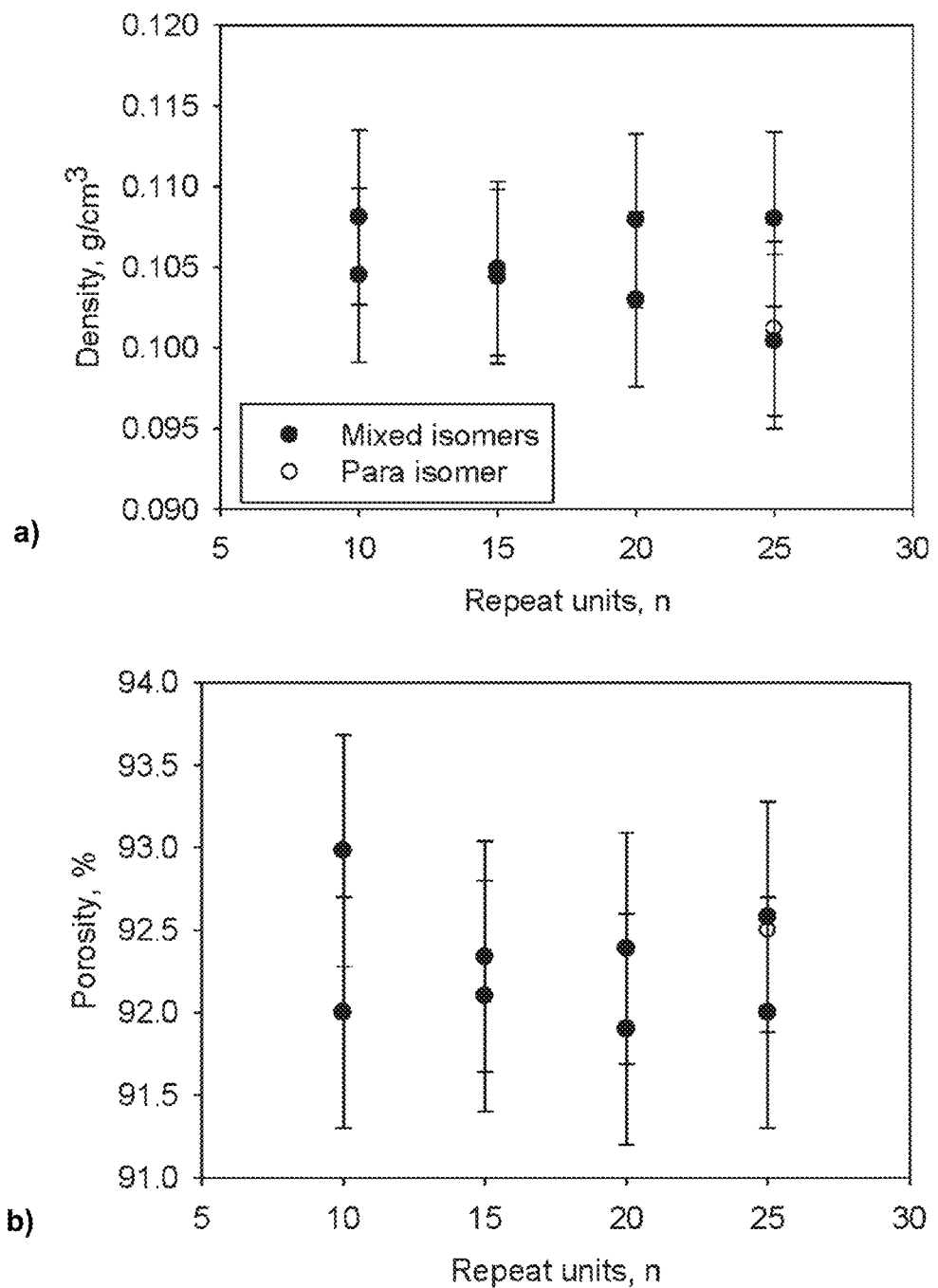
FIG. 3 provides (a) density and (b) porosity of aerogels graphed versus number of repeat units, n.

The densities of the polyimide aerogels all fall between 0.10 to 0.11 g/cm$^3$ as seen in FIG. 3, with no difference seen for number of repeat units between cross-links. Using bulk density ($\rho_b$) and skeletal density ($\rho_s$) measured by helium pycnometry, the percent porosity can be calculated using equation 1:

$$\text{porosity}=(1-\rho_b/\rho_s)\times 100\% \quad (1)$$

Again as shown in FIG. 3, no effect of the number of repeat units is seen on porosity which ranged from 91 to 92% for all aerogels studied. In addition, use of OAPS as a mixture of isomers (black circles in FIG. 3) for cross-linking versus p-OAPS (open circles) also appears to have no effect on density and porosity.

Figure 4:
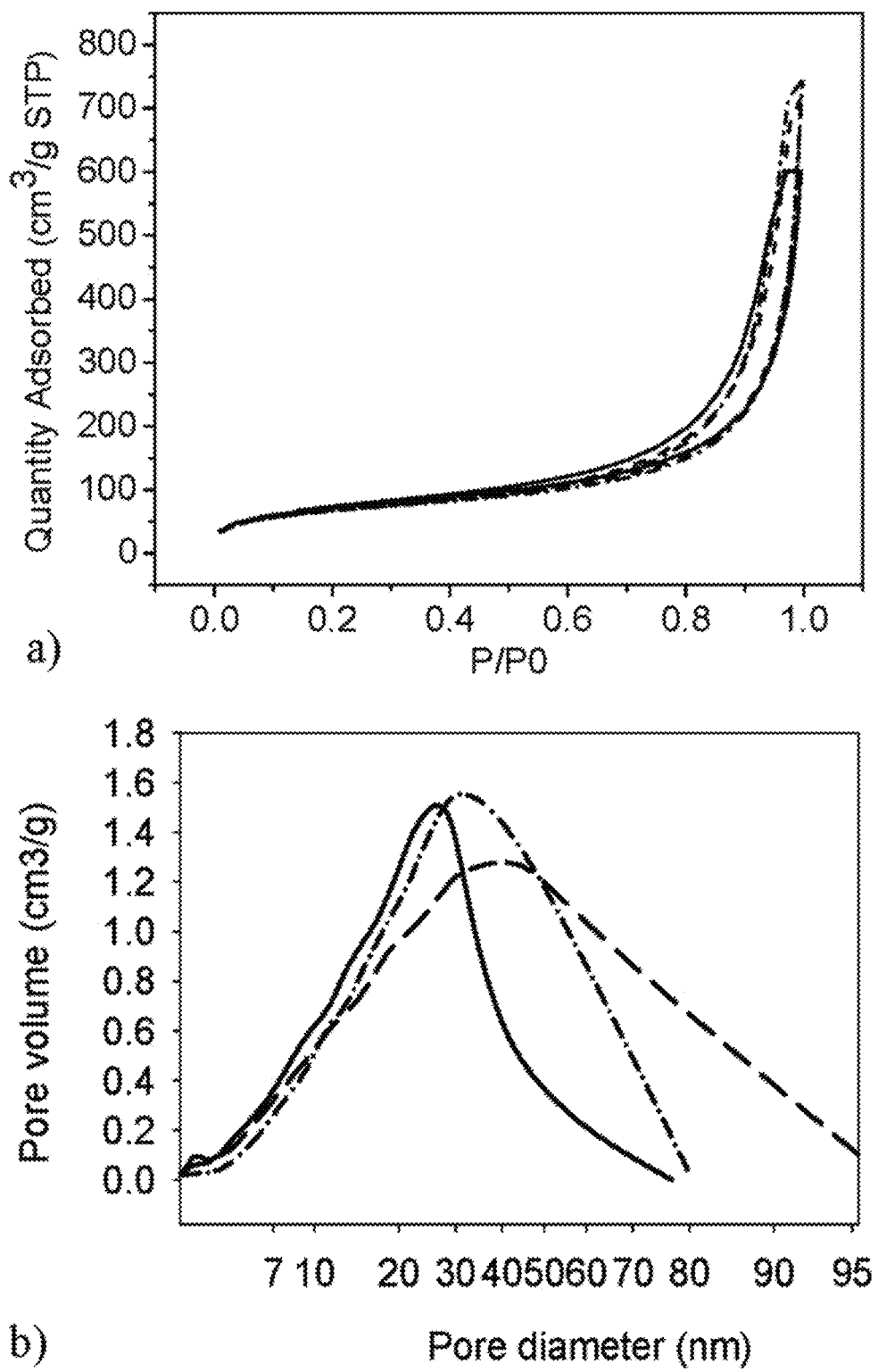
FIG. 4 shows (a) typical $N_2$ adsorption-desorption isotherms (at 77 K), and (b) a graph of relative pore volume versus pore diameter of the polyimide aerogel n=10 (dotted line), n=15 (dash line), n=20 (dash-dotted line) and n=25 (solid line).

The surface areas and pore volume of the monoliths were measured by nitrogen sorption using the Branuaer-Emmet-Teller (BET) method. The BET surface areas of the samples are in the range of 240-260 m$^2$/g again independent of number of repeat units or the OAPS isomer used. Typical nitrogen adsorption and desorption isotherms at 77 K for of the monoliths are shown in FIG. 4. IUPAC conventions have been developed to classify gas sorption isotherms and their relationship to the porosity of materials, in accordance with Barton, T. J. et al., Chem. Mater. 1999, 11, 2633-2656. In FIG. 4a, the adsorption isotherms are IUPAC type IV curves which identify the porosity as in the mesoporous range defined as between 2 and 50 nm according to the IUPAC convention. The hysteresis loop characterizing this type of isotherm is associated with capillary condensation of nitrogen in the mesopores. With increasing number of repeat units, n, plateaus at higher P/P$_0$ were observed, indicating a slight modification of the pore structures derived from longer polyimide oligomers. A graph of relative pore volume versus pore diameter is shown in FIG. 4b for the same samples. From FIG. 4b, it can be seen that the pore size distribution peaks around 25-40 nm (mesoporous) but trails out to about 100 nm (IUPAC convention defines macropore as >50 nm). Although the number of repeat units has little effect on the surface area, it does have a small effect on the pore size distribution. Aerogels formulated with n=25 have a sharper pore size distribution with a peak at 26 nm. For aerogels formulated with n=15, the pore size distribution is wider and the peak shifts to 40 nm.

Figure 5:
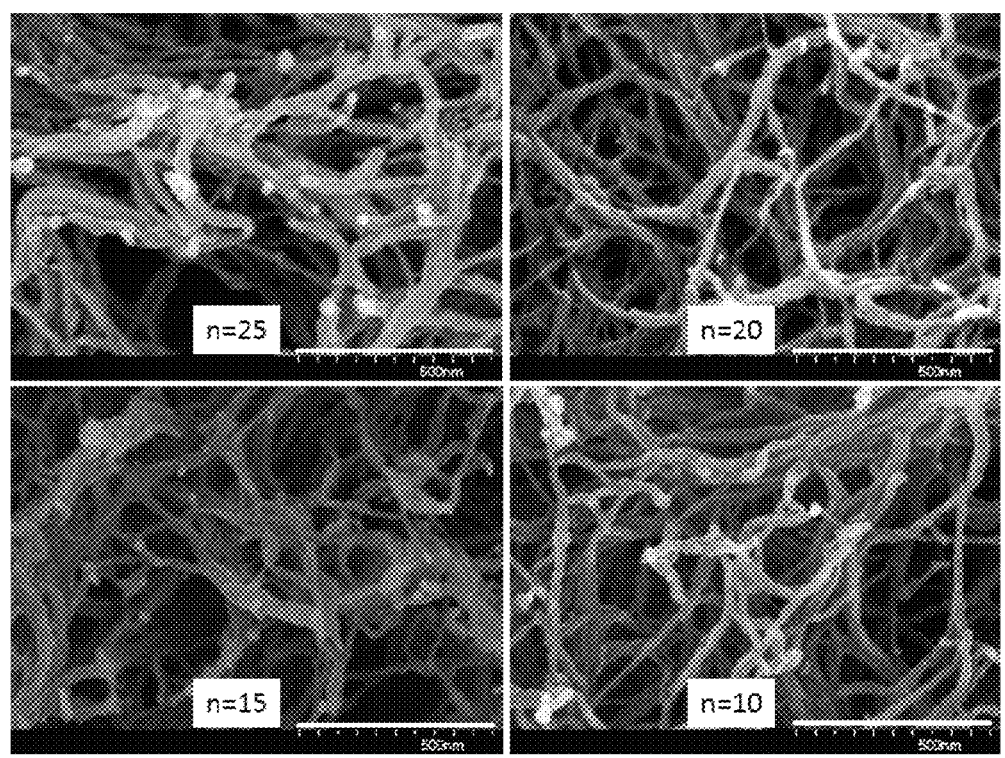
FIG. 5 shows SEM images of OAPS cross-linked polyimide aerogels using oligomers of n=10, n=15, n=20, and n=25. The scale bars in the micrographs are all 500 nm.

Scanning electron micrographs (SEM) of the samples are shown in FIG. 5. The samples do not look like silica aerogels, with the typical clusters or strings of particles. Rather, the polyimide aerogel morphology resembles bundles of polymer fibers tangled together with fiber diameters in the range of 15-50 nm. Also as seen in FIG. 5, in agreement with the results from the BET analysis, pore sizes can be seen ranging from mesoporous to as large as 200 nm and not much difference in the morphology can be detected between aerogels made using different n values.

Figure 6:
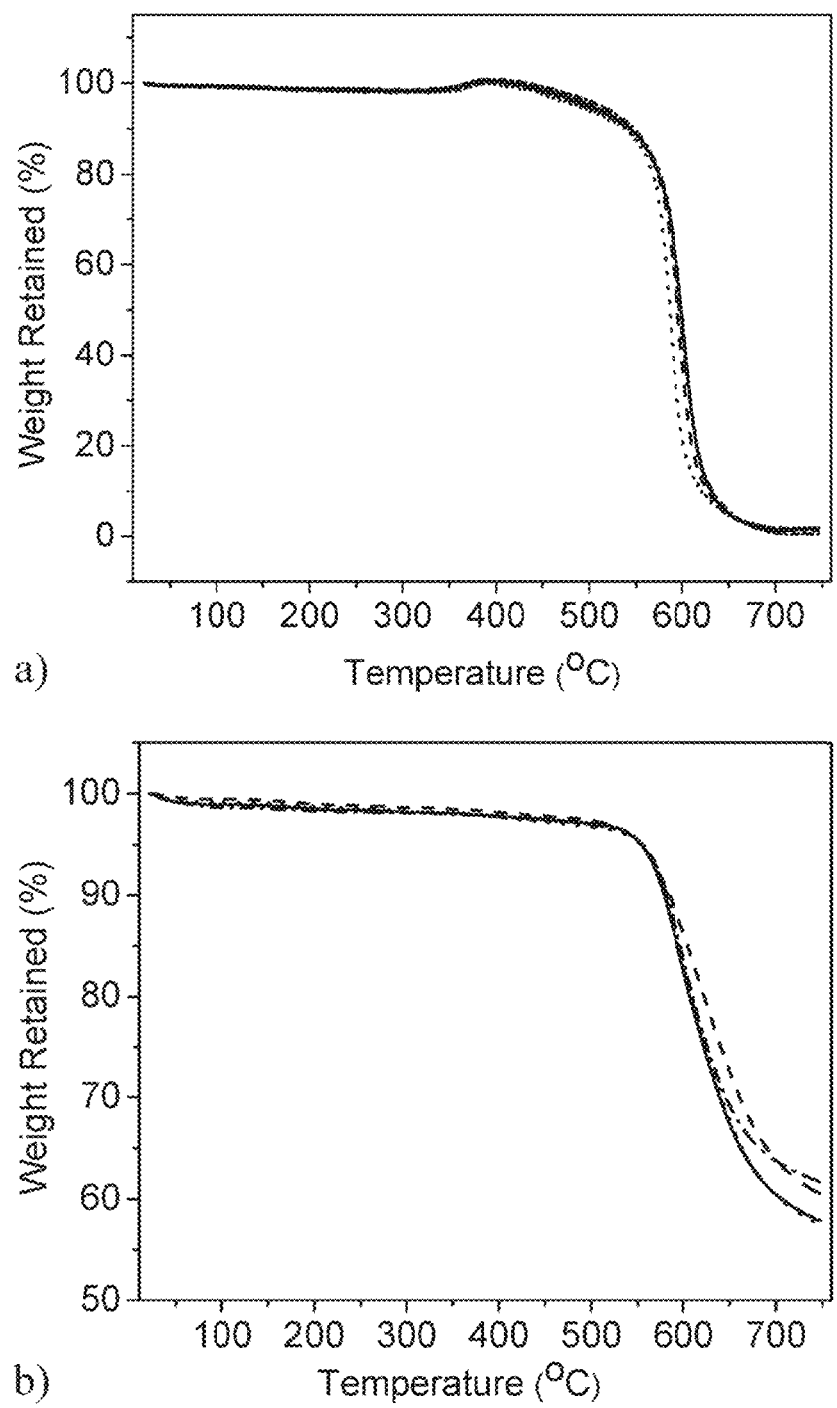
FIG. 6 provides TGA of the samples in (a) air and (b) nitrogen, with OAPS cross-link and oligomers of n=25 (solid line), n=20 (dash-dotted line), n=15 (dash line), and n=10 (dotted line).

Thermal gravimetric analysis (TGA) of the OAPS cross-linked polyimide aerogels was measured in both air and nitrogen from room temperature to 750° C., and is shown in FIG. 6. In both air and nitrogen, little weight loss occurs until the onset of decomposition at 560° C., indicating that imidization is complete and NMP is removed efficiently by solvent exchange to acetone and supercritical drying. The TGA in air shows a weight increase with an onset of about 300° C. for all samples, which may be due to oxidation of the methylene groups from BAX to carbonyl, a typical oxidation pathway for the diphenylmethyl moiety in high temperature polymers. There is little effect on the TGA curves due to the n value, with the exception of a slightly higher onset of degradation in nitrogen for aerogels produced from n=25 oligomers.

Figure 7:
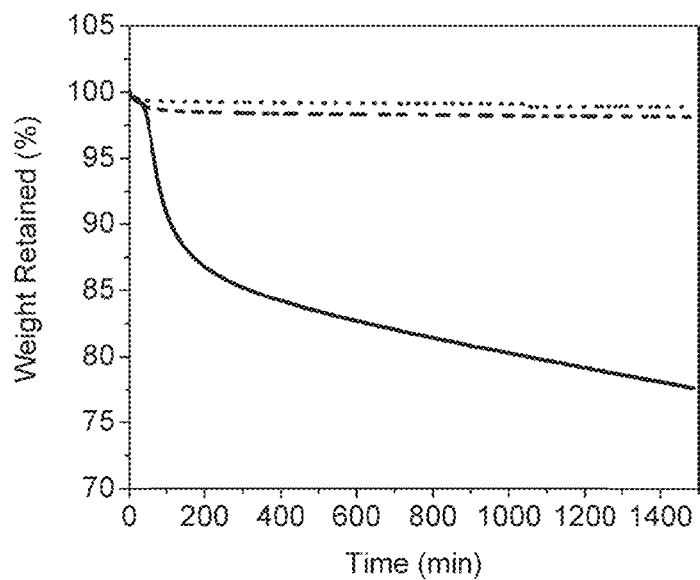
FIG. 7 provides isothermal TGA of OAPS cross-linked polyimide aerogel (n=20) in nitrogen for 24 h at 300° C. (dotted line), 400° C. (dash line) and 500° C. (solid line).
Figure 8:
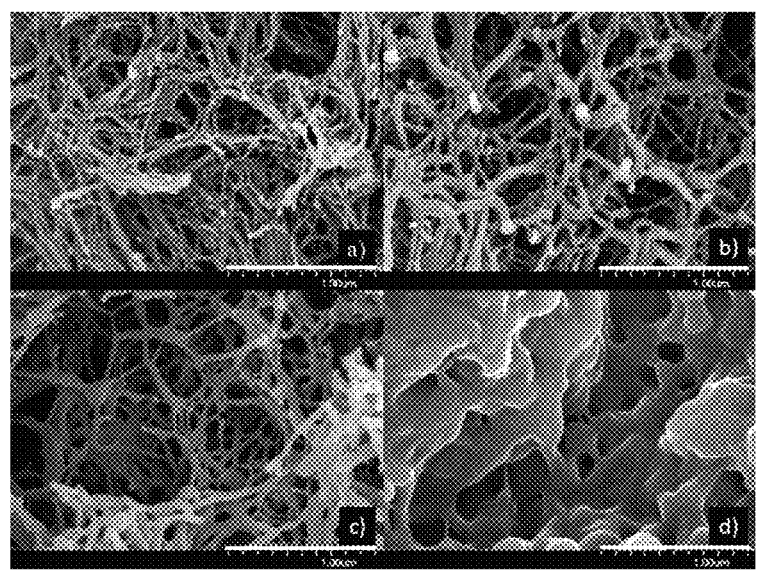
FIG. 8 shows SEM images of the OAPS cross-linked polyimide aerogel (n=20) at (a) room temperature and after heating for 24 h in nitrogen at (b) 300, (c) 400, and (d) 500° C. The scale bars in the micrographs are all 1.00 μm.

Isothermal TGA of the samples was carried out at three different temperatures (300, 400, and 500° C.) in nitrogen for 24 h. Graphs of weight retention versus time of the sample with n=20, are shown in FIG. 7. Weight loss at 300° C. (1%) and 400° C. (2%) after 24 h is quite low, suggesting short term use at these temperatures is possible. Indeed, SEM of samples after heating at 300 and 400° C. show little change. After 24 h at 500° C., however, weight loss is 22.4% and as shown in FIG. 8d, the mesoporous structure has collapsed.

Figure 9:
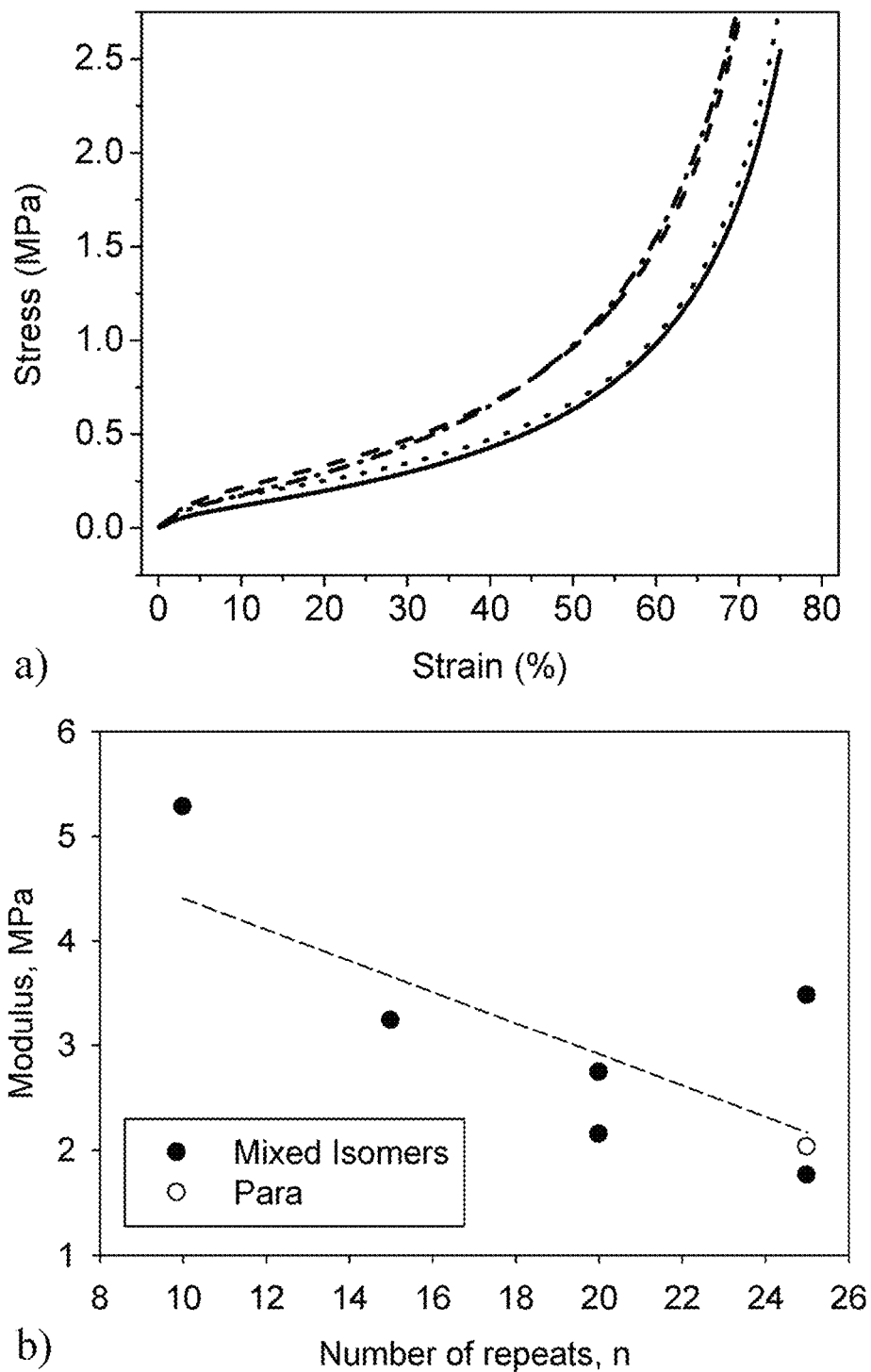
FIG. 9 shows (a) select stress-strain curves from compression of OAPS-polyimide aerogel at n=10 (dotted line), n=15 (dash line), n=20 (dash-dotted line), and n=25 (solid line); and (b) Young's modulus graphed versus number of repeat units, n.

Compression tests were performed on all aerogel formulations in the study and selected stress-strain curves are shown in FIG. 9a. The Young's modulus of the samples measured as the initial slope of the stress-strain curve ranged from 1.7 MPa to 5.3 MPa. Previously studied polymer reinforced silica aerogels with similar density have compressive modulus ranging from 0.1 to 2 MPa. Hence, OAPS cross-linked polyimide aerogels have similar or higher modulus than typical polymer reinforced silica aerogels. As shown in FIG. 9b, modulus decreases slightly as n is increased, despite the fact that density does not vary with n. Thus, this decrease in modulus must be due to the longer oligomer chains between OAPS cross-links. Also as shown in FIG. 9b, aerogels made using p-OAPS are similar in modulus to those made using a mixture of isomers.

Figure 10:
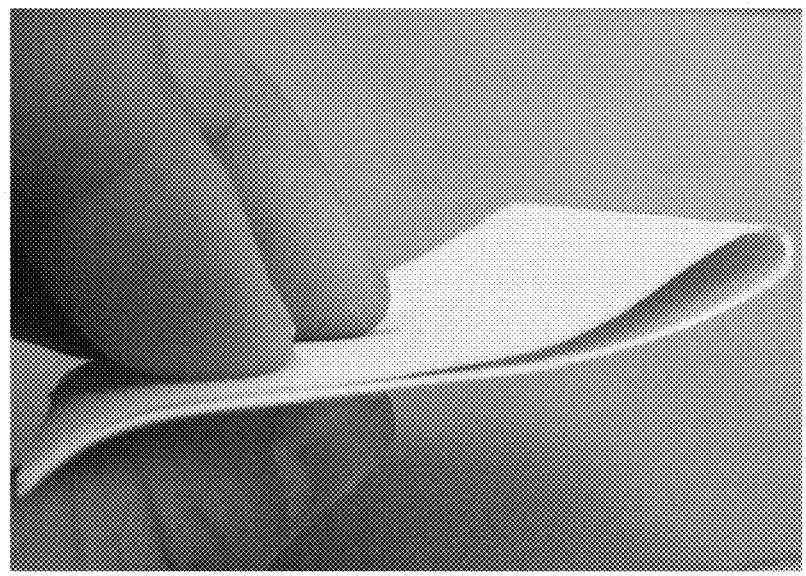
FIG. 10 shows OAPS cross-linked polyimide aerogel thin film (n=25).

It is possible to cast thin films of OAPS cross-linked polyimide aerogels as shown in FIG. 10. The thickness of the film is mainly determined by the casting Dr. Blade gap, the solution viscosity, casting speed and head pressure. With a casting speed of 20 cm/min, a 6 in. wide Dr. Blade with a gap of 0.76 mm, the final film has a thickness of nominally 0.5 mm. Thin films made using n=25 oligomers were very flexible. Lower n values result in more brittle films that crack when folded.

Polyimide aerogel films were tested for thermal physical properties between room temperature and 200° C. Thermal diffusivity (a) values were measured in nitrogen gas at two different pressures (p=760 Torr and 0.01 Torr) using the step heating (3P) method. Specific heating (Cp) values were determined using a differential scanning calorimeter. Thermal conductivity ($\lambda$) values were calculated using $\lambda=aCp\rho_b$, where $\rho_b$ is the bulk density of the sample. Multiple thermal diffusivity measurements were made at each temperature and pressure level and average values are used to calculate thermal conductivity. At a pressure of 760 Torr and room temperature, thermal diffusivity is measured to be $1.14\times10^{-3}$ cm$^2$/s and drops an order of magnitude at 0.01 Torr to $3.4\times10^{-4}$ cm$^2$/s.

Figure 11:
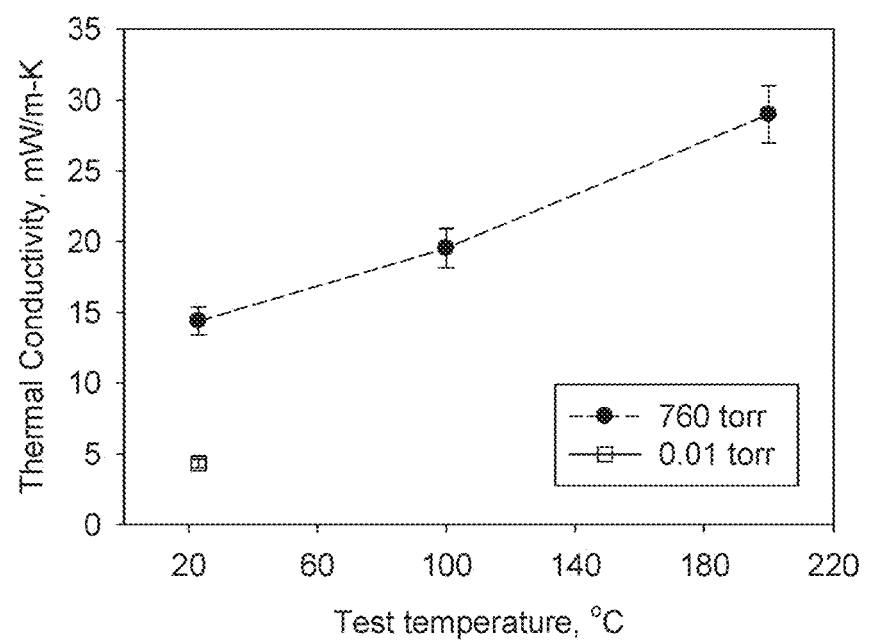
FIG. 11 shows thermal conductivity of OAPS cross-linked polyimide aerogels measured at different temperatures and pressures.

Thermal conductivity plotted versus temperature is shown in FIG. 11. Total relative expanded uncertainty (k=2) of the thermal conductivity determination is ±7%. As seen in the graph, the polyimide aerogel has thermal conductivity of 14.4 mw/(m K) at room temperature and 760 Torr, similar to silica aerogels of the same density as reported by Reichenauer, G. et al, Colloids Surf., A 2007, 300, 204-210. The thermal conductivity also increases with increasing temperature as expected and drops to 4.3 mW/(m K) at vacuum (0.01 Torr), which is also similar to that of the silica aerogel. Reducing the pressure lengthens the mean free path of the gas relative to the mean pore diameter, and there is a drop in thermal diffusivity and thus in the thermal conductivity.

Conclusions

A series of polyimide aerogels cross-linked using an aminophenyl decorated polysilsesquioxane, OAPS, was synthesized. The resulting aerogels have density ~0.1 g/cm$^3$, low shrinkage, high porosity (91-92%), and high surface area (240-260 m$^2$/g). With onset of decomposition of 560° C., the aerogels are quite stable, losing only 1-2% weight on aging for 24 h at 300 and 400° C. The polyimide aerogels have modulus as high as or higher than previously reported polymer reinforced silica aerogels, with similar thermal conductivity. In addition, thin films of the polyimide aerogels fabricated using n=25 oligomers are quite flexible, making them suitable for use as an insulation layer for inflatable structures, such as decelerators for entry, descent and landing applications. Tensile properties and other characteristics of these films are currently under further investigation. In addition, structure property studies of polyimide formulations using different diamines and dianhydrides are also in progress.

EXAMPLE 2

Experimental Section

Materials. 1,3,5-Triaminophenoxybenzene (TAB) was obtained from Triton Systems (200 Turnpike Rd #2, Chelmsford, Mass. 01824-4053). Pyridine, acetic anhydride, p-phenylene diamine (PPDA), and anhydrous N-methylpyrrolidinone (NMP) were purchased from Sigma Aldrich. 2,2'-Dimethylbenzidine (DMBZ), 4,4'-oxydianiline (ODA), benzophenone-3,3',4'4'-tetracarboxylic dianhydride (BTDA), and biphenyl-3,3',4,4'-tetracarboxylic dianhydride (BPDA) were obtained from Chriskev, Inc. (13920 W 108th Street, Lenexa, Kans., 66215). Dianhydrides were dried at 125° C. in vacuum for 24 h before use. All other reagents were used without further purification.

Instrumentation. Attenuated total reflectance (ATR) infrared spectroscopy was conducted using a Nicolet Nexus 470 FT-IR spectrometer. $^{13}$C NMR spectra of the polymers were obtained on a Bruker Avance 300 spectrometer using 4 mm solids probe with magic angle spinning at 11 kHz and cross-polarization. Spectra were externally referenced to the carbonyl peak of glycine (176.1 ppm relative to TMS). A Hitachi S-4700 field emission microscope was used for the scanning electron microscope (SEM) images after sputter coating the specimens with gold. The samples were outgassed at 80° C. for 8 h under vacuum before running nitrogen-adsorption porosimetry with an ASAP 2000 surface Area/Pore Distribution analyzer (Micromeritics Instrument Corp.) The skeletal density was measured using a Micromeritics Accupyc 1340 helium pycnometer. Thermal gravimetric analyses (TGA) was performed using a TA model 2950 HiRes instrument. Samples were run at a temperature ramp rate of 10° C. per min from room temperature to 750° C. under nitrogen and air. Glass transition temperatures were obtained using a TMA 2940 thermomechanical analyzer from TA Instruments.

Synthesis of Polyimide Aerogels Using Chemical Imidization. Polyimide aerogels were prepared as shown in the scheme in FIG. 12. Aerogels from three different diamines (ODA, DMBZ, or PPDA) and two different dianhydrides (BPDA or BTDA) with the formulated number of repeat units, n, varied between 15 and 30, were prepared according to Table 1 as 10 wt ° A) solutions of polyimide in NMP. As an example, preparation of n=30 polyimide aerogel using BPDA, TAB and ODA (Table 1, run 22) is described. To a solution of ODA (3.16 g, 15.8 mmol) in 50 mL of NMP under nitrogen was added BPDA (4.79 g, 16.3 mmol). After all the BPDA dissolved, a solution of TAB (0.14 g, 0.35 mmol) in 16 mL of NMP was added with stirring. After 10 min of stirring, acetic anhydride (12.3 mL, 130 mmol, 8:1 molar ratio to BPDA) and pyridine (10.5 mL, 130 mmol) were added to the solution. Immediately after mixing, the solution was poured into prepared molds. The solution gelled within 20 min. The gels were aged for 24 h in the mold. Following aging, the gels were extracted into a solution of 75% NMP in acetone, and soaked overnight. Subsequently, the solvent was exchanged in 24 h intervals with 25% NMP in acetone, and finally 100% acetone. The solvent was removed by supercritical CO$_2$ extraction, followed by vacuum drying overnight at 80° C., resulting in polyimide aerogels having a density of 0.203 g/cm$^3$. $^{13}$C CPMAS NMR (ppm): 124.4, 130.7, 143.2, 155, 165.6. FTIR: 1774.7, 1718.2, 1501.0, 1374.8, 1241.4, 1170.3, 1115.3 1087.8, 878.9, 830.0, 737.6.

Thin film fabrication was carried out using a roll-to-roll casting system. The same 10 w/w % NMP solution as above was cast onto a PET carrier film running at a speed of 80 cm/min using a 12 in. wide Doctor blade with front opening gap set at 1.09 mm. The film that gelled within 30 min was sealed in a plastic bag and aged for 24 h before peeling away from the PET carrier. Afterwards, the films were washed in 24 h intervals in 75% NMP in acetone, followed by 25% NMP in acetone and finally in 100% acetone. Supercritical drying gave polyimide aerogel thin films (0.45 mm) with similar properties to above.

Compression Tests. The specimens were tested in accordance with ASTM D695-10 with the sample sizes nominally 1.5-1.8 cm in diameter and 3 cm in length (close to the 1:2 ratio of diameter to length prescribed for the testing of polymer foams). The samples were tested between a pair of compression platens on a model 4505 Instron load frame using the Series IX data acquisition software. The platen surfaces were coated with a graphite lubricant to reduce the surface friction and barreling of the specimen.

Figure 20:
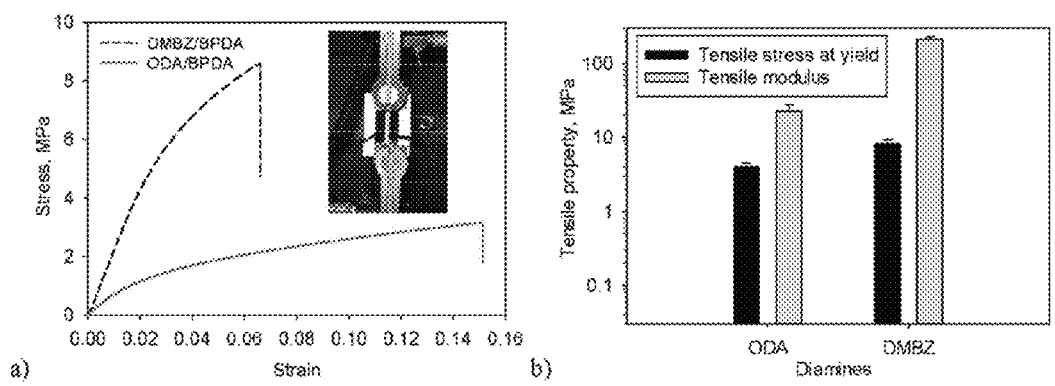
FIG. 20 shows (a) stress-strain curve from typical tensile testing of ODA-BPDA and DMBZ-BPDA polyimide aerogel cross-linked using TAB with inset showing a specimen mounted in the load frame, and (b) comparison of average tensile modulus and average tensile stress at yield between polyimide aerogels made with different diamines.

Tensile Tests. Thin film specimens nominally 5 mm wide by 33 mm long were mounted on a rectangular paperboard frame using adhesive tape as shown in the inset for FIG. 20. This setup supports and aligns the flexible film to install on the Instron 5567 load frame controlled with Bluehill software. The sides of the paperboard were cut after mounting and before the test. Tensile tests were run using 100 N load and an extension speed of 2 mm/min based on ASTM D882. Reported tensile properties are the average of six tests.

Statistical Analyses. Experimental design and analyses were conducted using Design Expert Version 8.1, available from Stat-Ease, Inc., Minneapolis, Minn. Multiple linear regression analysis was used to derive empirical models to describe the effect of each of the process variables studied on measured properties. Full quadratic models including all main effects, second-order effects and all two way interactions was entertained, and continuous variables were orthogonalized (transformed to −1 to +1 scale) before analysis. Terms deemed to not be significant in the model (<90% confidence) were eliminated one at a time using a backward stepwise regression technique.

Results and Discussion

Figure 12:
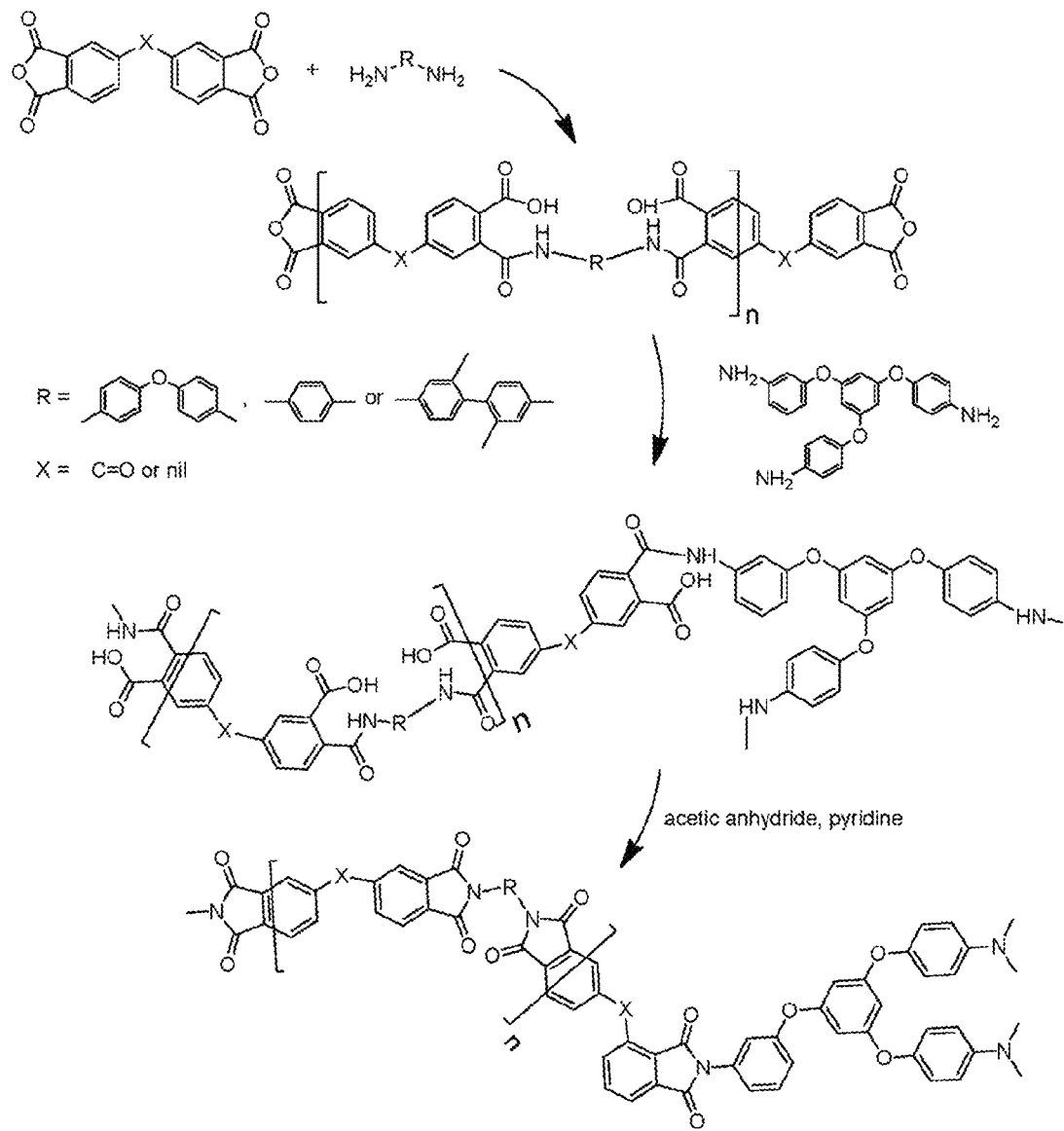
FIG. 12 is a scheme of a general synthesis route for polyimide aerogels cross-linked with TAB.

Polyimide aerogels with TAB cross-links were synthesized as shown in the scheme in FIG. 12. Polyamic acid oligomers capped with anhydride were formed in solution. Enough TAB was added with stirring to react with anhydride end-caps, followed by addition of an eight fold excess of acetic anhydride and pyridine to effect chemical imidization and gelation at room temperature. It should be noted that it is the addition of TAB not imidization catalyst that induces gelation, because a polyamic acid cross-linked network forms as shown in the scheme in FIG. 12 even without the addition of acetic anhydride and pyridine as previously reported by Meador, M. A. B. et al. Polym. Prepr. 2010, 51, 265-266. For this reason, the catalysts must be added soon after addition of TAB before the solution phase separates in order to obtain a homogeneous solution and accordingly a homogeneous gel.

Figure 13:
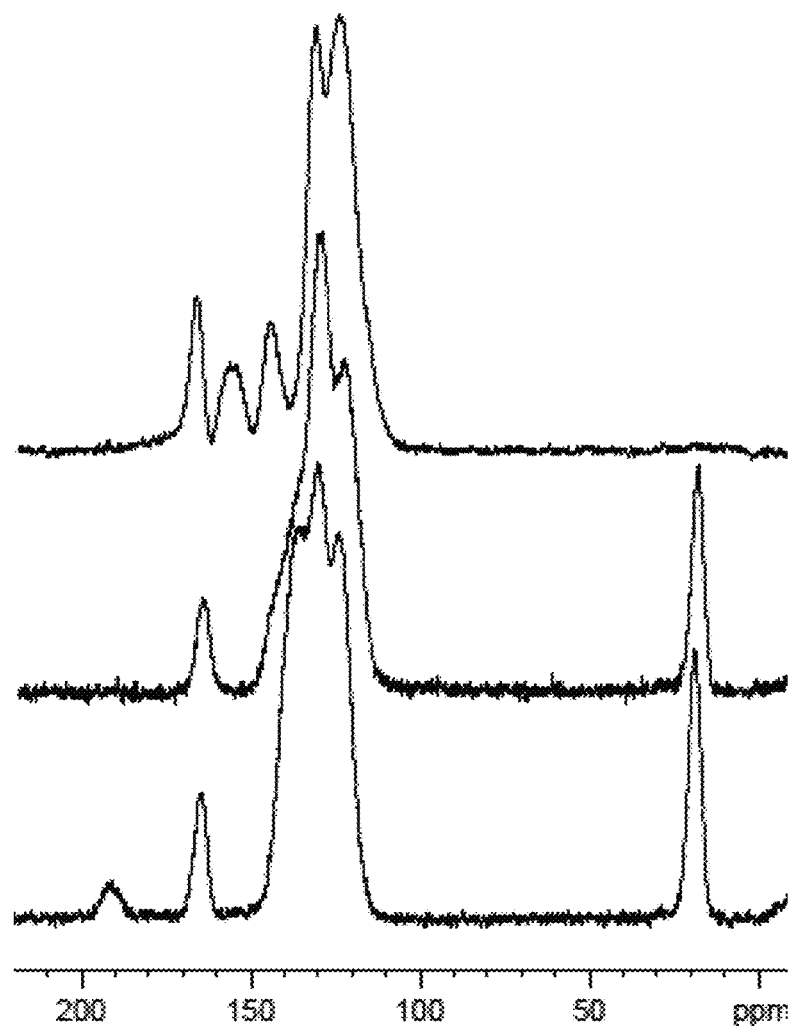
FIG. 13 shows solid NMR of selected formulations of polyimide aerogels showing (top) sample 22 made with BPDA/ODA, (middle) sample 20 made with BPDA/DMBZ, and (bottom) sample 21 made with BTDA/DMBZ.

Because NMP is not as soluble in supercritical $CO_2$ and is therefore difficult to remove directly, the solvent in the gels was exchanged to acetone in a series of steps before supercritical drying. Solid NMR spectra of the polyimide aerogels showed them to be free of solvent after drying. Selected NMR spectra of three sample formulations are shown in FIG. 13. All spectra contain an imide carbonyl peak at 165 ppm as well as broad aromatic peaks between 115 and 140 ppm characteristic of these polyimides. Aerogels made from ODA as diamine (top spectrum) also have a peak at 155 ppm characteristic of the aromatic ether carbon. Aerogels made using DMBZ as diamine (middle and bottom spectra) give an aliphatic peak at 19 ppm for the pendant methyl groups. Finally, aerogels made using BTDA have an additional peak at 193 ppm characteristic of the benzophenone carbonyl.

Figure 14:
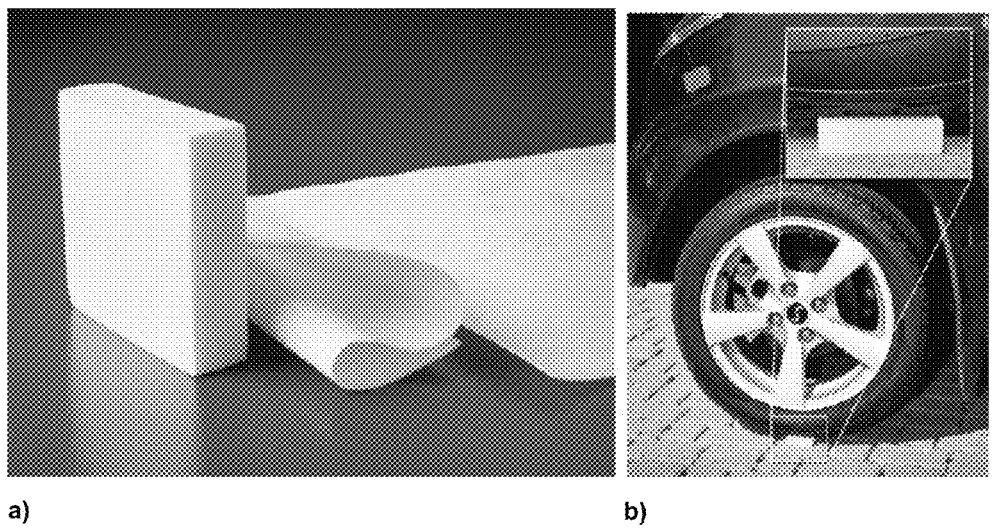
FIG. 14 shows (a) polyimide aerogels cross-linked with TAB shown fabricated as flexible thin films or molded to a net shape, and (b) demonstrating strength by supporting the weight of a car.

FIG. 14 shows a picture of typical aerogels made using TAB as a cross-linker. The aerogels are light yellow to orange yellow in appearance. Thin films (nominally 0.5 mm) of the aerogels from certain formulations are flexible—the films can be rolled or folded backward on themselves and completely recover with no evidence of cracking or flaking. Thicker parts such as the 6.5 cm×6.5 cm×1.3 cm rectangular prism shown in FIG. 14*a* are rigid and strong, even able to support the weight of a car as seen in FIG. 14*b* (although more rigorous compression testing is described vide infra).

Properties of polyimide aerogels made from three different diamines and two dianhydrides with n formulated from 15 to 30 are listed in Table 1. This range was studied because gels made from shorter oligomers (lower formulated n) reacted too quickly for incorporation of catalyst for chemical imidization before phase separation occurs. Formulations made using ODA and DMBZ were made from 10 w/w % solutions, whereas because of very fast gelation times, the PPDA samples had to be made from less concentrated 5 w/w % solutions. Analyzing the data using multiple linear least squares regression gives empirical models of the effect of the significant variables on the measured properties of the aerogels. For almost all measured responses, the formulated number of repeat units, n, in the range of 15 to 30, was not found to be a significant factor in the models over and above random error. Thus, the data are presented as bar graphs showing the effect of diamine and dianhydride on the modeled responses with error bars representing the standard deviation of the regression.

Figure 15:
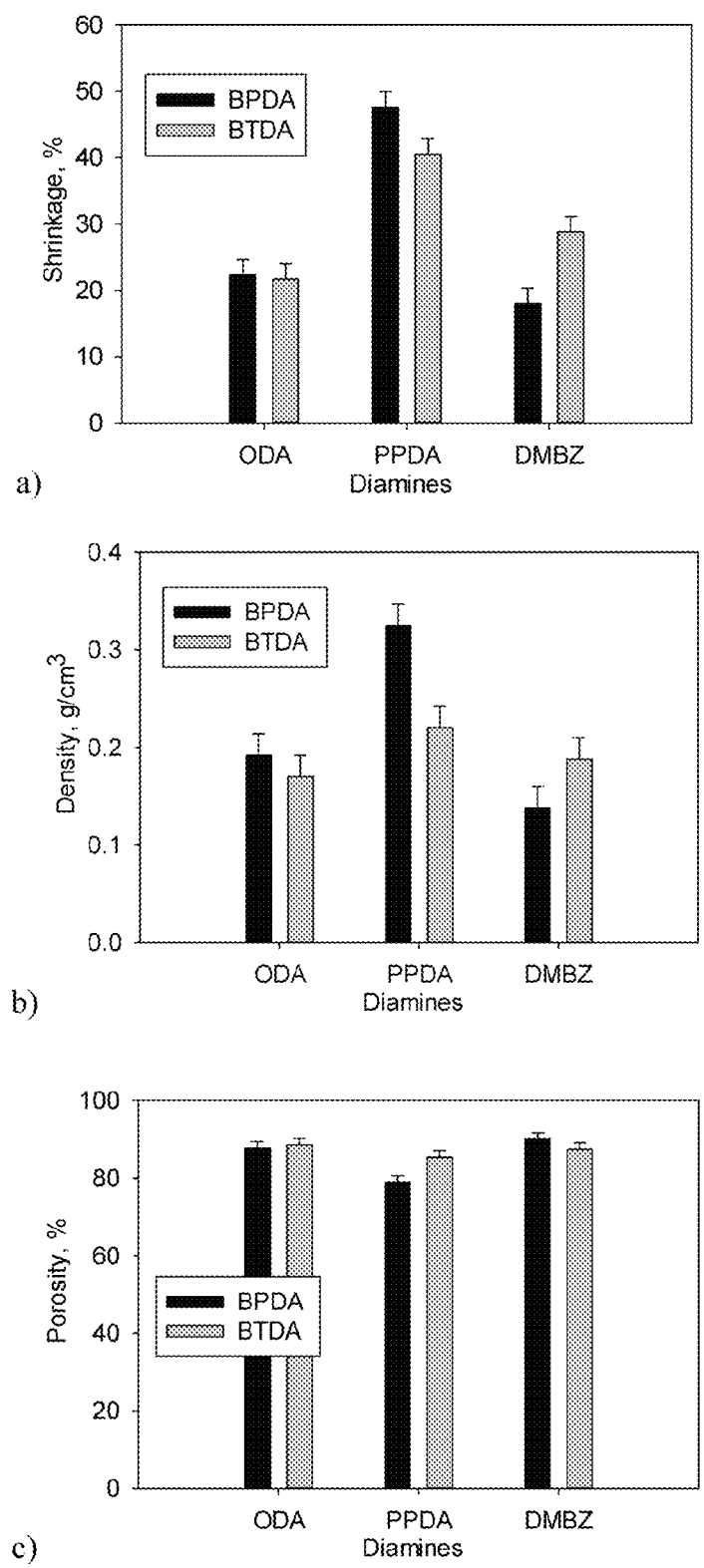
FIG. 15 shows properties of polyimide aerogels cross-linked with TAB including: (a) average shrinkage during processing; (b) average density; and (c) average porosity. Error bars represent one standard deviation calculated by statistical modeling of all data.
Figure 16:
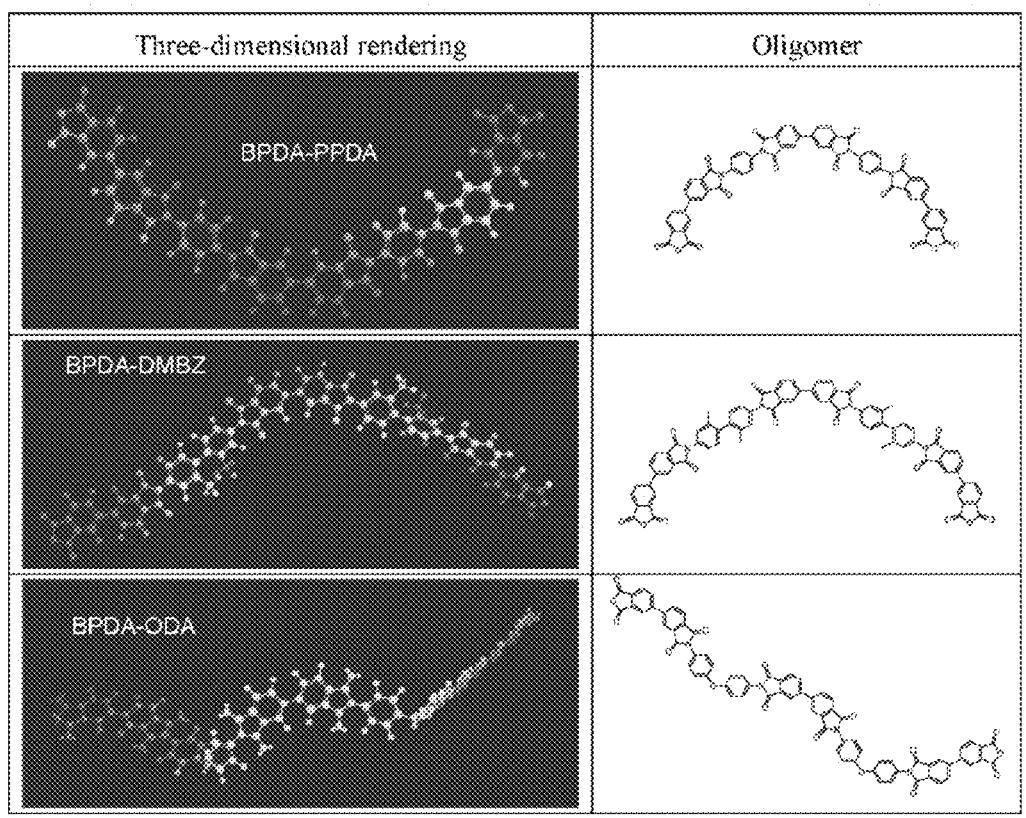
FIG. 16 shows three-dimensional renderings of polyimide oligomers from BPDA and various diamines derived from geometry optimization using MM2. In the renderings, atoms of the same color occupy the same plane.

Shrinkage occurs during fabrication of the aerogels, mostly during initial gelation but some additional shrinkage may occur on solvent exchange and supercritical drying. It might be expected that using PPDA or DMBZ in the polymer backbone would help the gels resist shrinkage, since both make the polymer backbone more rigid. This is not the case. As seen in FIG. 15*a*, shrinkage (standard deviation=1.92%, $R^2$=0.97) is more pronounced in aerogels made using PPDA (40+ %) compared to those made from ODA or DMBZ (17-30%). The least amount of shrinkage was seen for aerogels made using the combination of DMBZ and BPDA. Since most of the shrinkage occurs during gelation (polymer formation), greater shrinkage in PPDA derived polyimide aerogels may in part be due to the ability of the polymer chains to pack more closely together compared to polyimides made with either DMBZ or ODA. FIG. 16 compares three dimensional renderings of n=2 oligomers of BPDA with PPDA, DMBZ, or ODA derived from geometry optimization calculations using MM2. Energy minimization calculations using MM2 were made using ChemPro 3D version 12 from CambridgeSoft using a modification of Allinger's Force Field method as described in Dudek, M. J. et al., J. Comput. Chem. 1995, 16, 791-816. The oligomers are shown with colors representing atoms residing in different planes. Note that the atoms of oligomers from PPDA and BPDA are the same color (red) through almost two repeat units, indicating a high degree of planarity. In contrast, the methyl groups in DMBZ force the phenyl rings to be out of plane with a torsional angle of 75° as measured by X-ray crystallography, in accordance with Chuang, K. C. et al., J. Macromolecules 1997, 30, 7183-7190, and therefore DMBZ BPDA oligomers are non-coplanar. It is well-known that non-coplanarity in the polyimide backbone induces different relaxation behavior, leads to higher solubility, and some microporosity, in polyimide films and composites, as shown by Coburn, J. C. et al, Macromolecules 1995, 28, 3253-3260, Kim, Y. H. et al., Macromolecules 2005, 38, 7950-7956, and Ritter, N. et al., J. Macromolecules 2011, 44, 2025-2033, respectively. It is plausible that this also induces less shrinkage during gelation attributable to less interaction between polymer chains or to the greater solubility. Oligomers produced using ODA are also non-coplanar due to the oxygen linking groups between the phenyl rings and also exhibit lower shrinkage with either dianhydride, even though this is not a rigid structure. Lower shrinkage here may be due to interaction of the polar solvent with the oxygen link of ODA during gelation. If the oxygen links keep the growing polymer chains from phase separating for longer time, perhaps the network structure that finally forms is better able to resist shrinkage. On the other hand, shrinkage is on the average 7-8% lower when BTDA is combined with PPDA compared to that of BPDA-PPDA, but is 10% higher for BTDA-DMBZ compared to BPDA-DMBZ. Clearly, shrinkage is more complex than described herein, with solvent interactions, rigidity of the chains, and interaction between chains possibly all playing a part.

As expected, aerogel densities as shown in FIG. 15b (standard deviation=0.016 g/cm$^3$, $R^2$=0.94) echo the shrinkage. Highest densities are produced from PPDA as diamine, especially when BPDA is the dianhydride (0.33 g/cm$^3$). Lowest densities result from the combination of BPDA and DMBZ (0.14 g/cm$^3$). Porosity of the aerogels shown in FIG. 15c (standard deviation=1.41%, $R^2$=0.88) is also influenced by shrinkage with the lowest porosities resulting from aerogels containing PPDA (78-86%). All of the other polyimide aerogel formulations ranged from 86 to 90% porous.

Figure 17:
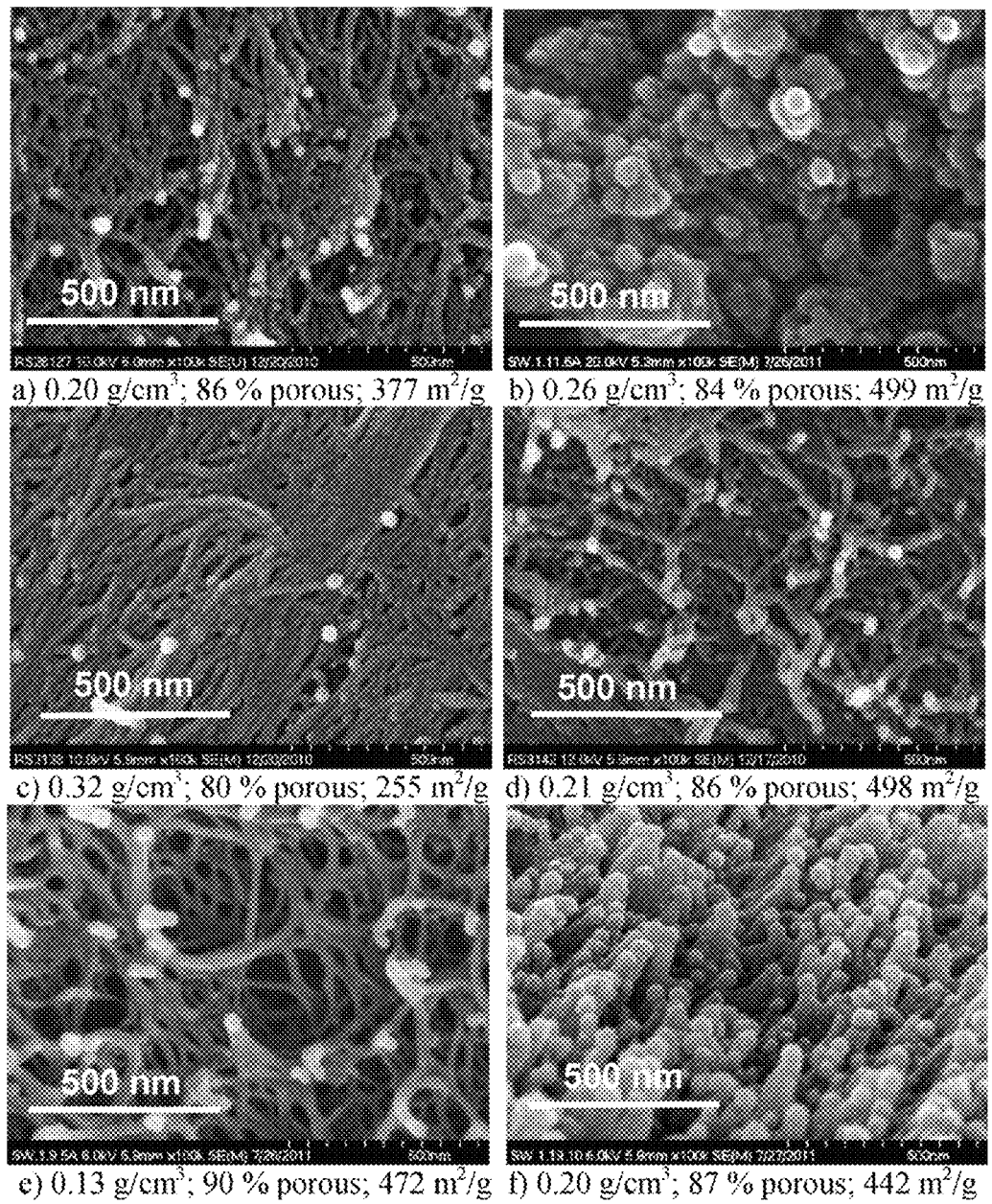
FIG. 17 shows SEM of chemically imidized polyimide aerogels from (a) ODA/BPDA, n=20; (b) ODA/BTDA, n=20; (c) PPDA/BPDA, n=25; (d) PPDA/BTDA, n=20; (e) DMBZ/BPDA, n=30; and (f) DMBZ/BTDA, n=30.

Interestingly, the pore structure as observed by SEM shown in FIG. 17 for the aerogels produced using different diamines and dianhydrides are quite dissimilar. Aerogels derived from BPDA (image a, ODA; image c, PPDA; and image e, DMBZ) all appear as collections of polymer strands ranging from 30-50 nm in thickness. The amount of porosity evidenced in each of these micrographs is commensurate with the amount of shrinkage as previously discussed with the combination of PPDA-BPDA showing the least porosity, and the DMBZ-BPDA showing the most porosity. The combination of BTDA and ODA (FIG. 17b) produced aerogels that are the most reminiscent of silica aerogels with clusters of 50-100 nm particles loosely connected together. The combination of BTDA with DMBZ (FIG. 17f) also appears as clusters of nanoparticles, but the particle sizes are smaller (~50 nm) and more uniform.

Figure 18:
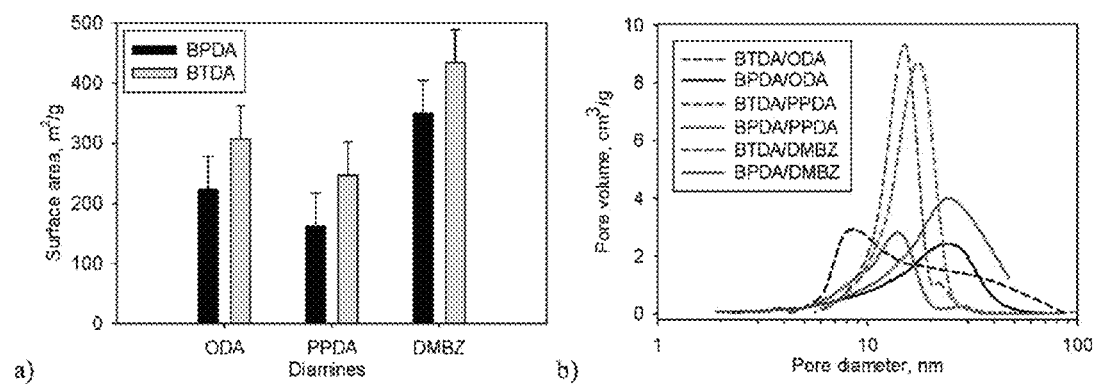
FIG. 18 shows graphs of (a) average surface areas for n=30 polyimide aerogels with error bars representing one standard deviation from fitted models, and (b) pore size distributions for different formulations.

Differences in pore structure are also reflected in the surface area measurements made by nitrogen sorption using the Brunauer-Emmet-Teller (BET) method, in accordance with Brunauer, S. et al., J. Am. Chem. Soc. 1938, 60, 309. FIG. 18a shows a plot of the average surface areas for different combinations of diamine and dianhydride. The model for surface area (standard deviation=55 m$^2$/g, $R^2$=0.7) is the only one in the study where formulated number of repeat units, n, has a significant effect. In this case, increasing formulated n significantly reduces surface area by about 75 m$^2$/g over the whole range. For comparison sake, in the plot in FIG. 18a, average surface areas are shown for n=30 formulated oligomers. Note that surface areas on the average are significantly larger (~80 m$^2$/g) for BTDA aerogels than those made from BPDA. Aerogels made using DMBZ with either BTDA or BPDA have the largest surface areas while use of PPDA significantly reduces surface area. It might be expected that the same solvent interactions, chain rigidity and coplanarity also have a role in surface area, since this characteristic should also arise from the way the polymer chains pack together. Average pore diameters for BTDA aerogels (FIG. 18b, dotted lines) made with PPDA and DMBZ tend to be small (on the order of 10-20 nm) with a sharp pore size distribution. In comparison, aerogels made from a combination of BTDA and ODA have a broader, bimodal pore size distribution, ranging from below 10 nm to almost 100 nm. Pore size distribution for aerogels made with BPDA (FIG. 18b, solid lines) and PPDA is similar to that of BTDA, whereas peaks for DMBZ and ODA aerogels with BPDA are shifted to larger pore diameters. Pore sizes seen in the SEMs, especially for aerogels made from the combination of DMBZ-BPDA shown in FIG. 17e, appear larger than values measured by nitrogen sorption-desorption. Note that this technique is not sensitive to pores larger than 100 nm. The smaller pores measured by this technique may also be contained within the polymer strands or particles, and would not be visible in the SEMs.

Figure 19:
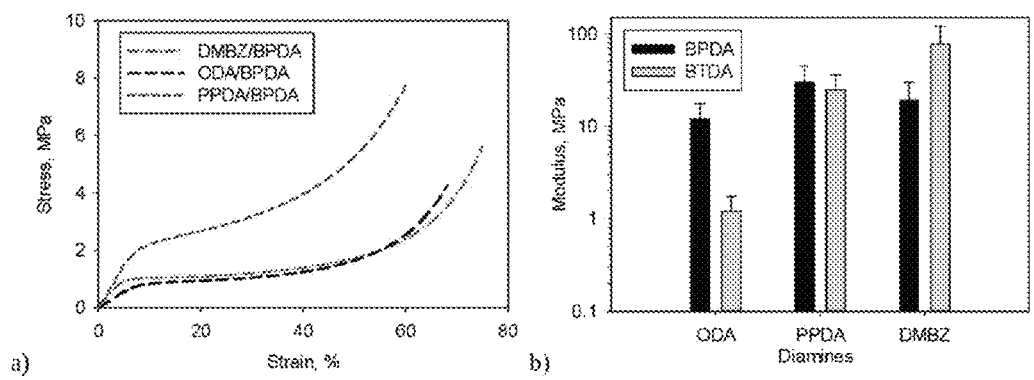
FIG. 19 shows graphs of (a) stress-strain curves from compression for selected polyimide aerogels, and (b) comparison of average Young's Modulus for different formulations with error bars representing one standard deviation from fitted models.

Stress-strain curves from compression testing of select formulations of polyimide aerogels are shown in FIG. 19a. Stress-strain curves are similar to those of silica and polymer reinforced silica aerogels with a linear elastic region up to about 4-5% strain and exhibiting yield up to about 40-50% strain, as reported by Katti, A. et al., Chem. Mater. 2006, 18, 285-296. Young's modulus taken as the initial slope of the stress-strain curve of the aerogels made from different diamines and dianhydrides is shown in FIG. 19b (log standard deviation=0.38, $R^2$=0.95). For aerogels, in general, modulus increases with increasing density. For the polyimides, highest average modulus is seen for aerogels made from DMBZ and BTDA which are not the highest density aerogels produced in the study. In fact, aerogels made from DMBZ and BPDA are among the lowest density and have average modulus rivaling the highest density PPDA aerogels. This is surprising in that PPDA and DMBZ aerogels both have a stiff backbone structure, so it might be expected that modulus would be similar at similar density. Higher average modulus in DMBZ containing aerogels could be due to more complete polymerization as has been seen in comparison of modulus in other studies of polyimides, e.g. Chuang, K. C. et al., Macromolecules 1997, 30, 7183-7190. Mechanical properties in silica aerogels are also known to depend on better connectivity between particles (more complete reaction), as shown for example by Gross, J. & Fricke, J. Nanostruct. Mater. 1995, 6, 905-908. In fact, mathematical modeling and re-evaluation of percolation theory has shown that some of the mass of the aerogel may be dangling mass and not contributing to the overall strength of the material, as reported by Ma, H. S. et al., J. Non-Cryst. Solids 2000, 277, 127-141. This has also been demonstrated experimentally for epoxy-reinforced silica aerogels where optimal flexural strength was reached at less than the highest density aerogels reported. It was shown by NMR that incomplete reaction leading to dangling epoxy chains contributed to the greater density but not to increased strength, as reported by Meador, M. A. B. et al., Chem. Mater. 2005, 17, 1085-1098. None of the analyses (DSC, FT-IR, or TGA) indicate differences in extent of imidization, though slight differences could have a significant effect on mechanical properties.

Continuous polyimide aerogel thin films can be fabricated using a roll to roll casting method from 10 w/w % solutions in NMP as previously described by Guo, H. et al., ACS Appl. Mater. Interfaces 2011, 3, 546-552. Formulations made from ODA or DMBZ and BPDA and a formulated n=30, form flexible films as shown in FIG. 14. Typical stress-strain curves from tensile testing of these ODA-BPDA and DMBZ-BPDA films are shown in FIG. 20a. Note that ODA films break at lower stress but at higher tensile strain than DMBZ films. FIG. 20b shows a comparison of tensile modulus and tensile stress at yield for each of the films. Tensile modulus taken as the average of five tests is 23 MPa (standard deviation=5.4) for ODA films, while that of DMBZ films is 217 MPa. Average tensile stress at break is 4.1 MPa (standard deviation=0.4) for ODA films and 8.7 MPa (standard deviation=0.93). As previously mentioned (vide supra) the films can be rolled or folded back on themselves and fully recover without any ill effects. Films using ODA can take a crease whereas DMBZ films crack easier on creasing.

Figure 21:
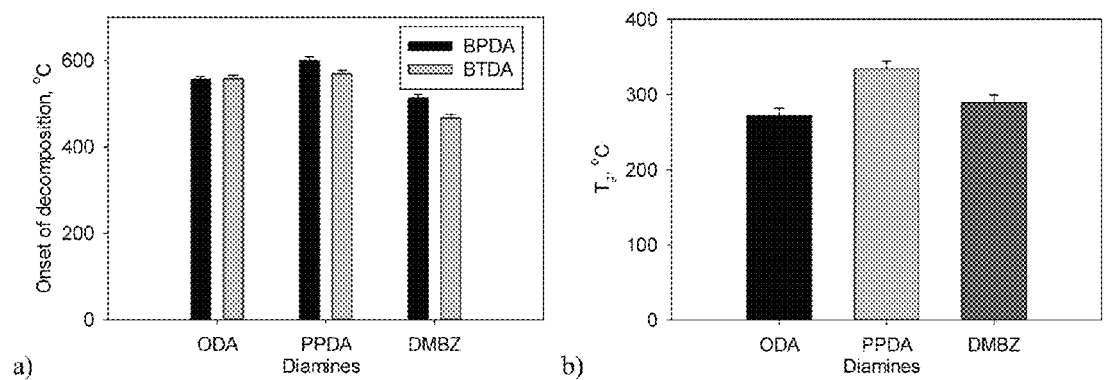
FIG. 21 shows graphs of (a) average onset of decomposition as measured by TGA in nitrogen and (b) average glass transition temperature from TMA of polyimide aerogels cross-linked with TAB. Error bars represent one standard deviation from fitted models.

Comparisons of the thermal behavior of the aerogel formulations are shown in FIG. 21. As seen in FIG. 21a, the formulations with the highest onset of decomposition (standard error=7.8° C., $R^2$=0.96) are made using PPDA and BPDA. Formulations made using ODA have a slightly lower onset of decomposition because of the oxygen linkages, whereas DMBZ has the lowest onset because of the pendant methyl groups. BTDA containing formulations degrade at a slightly lower temperature than BPDA formulations. These observations are in agreement with previous studies of thermal stability of polyimides in bulk (non-porous) form, as reported by Hergenrother, P. M. High Perform. Polym. 2003, 15 (1), 3-45, Ehlers, G. F. L & Soloski, E. J. Thermal Analysis of Polymers in Air; Technical report AFML-TR-78-64; Air Force Materials Laboratory: Wright-Patterson AFB, OH, 1978, and Dine-Hart, R. A. & Wright, W. W. Makromol. Chem. 1972, 153, 237-254. Average glass transition temperature, $T_g$ shown in FIG. 21b (standard error=10° C., $R^2$=0.89), depends only on diamine used in the formulation (dianhydride is not seen to have a significant effect on average $T_g$ in this study above and beyond standard error). Formulations made from PPDA have the highest average $T_g$ (334° C.) with DMBZ formulations about 40° C. lower at 290° C. Formulations containing ODA with the more flexible oxygen linking group have the lowest average $T_g$ (271° C.). These trends are also consistent with $T_g$ measured for bulk polyimides, as reported by Hergenrother, P. M. High Perform. Polym. 2003, 15 (1), 3-45, and Critchley, J. P. et al., Heat Resistant Polymers; Plenum Press: New York, 1983.

Conclusions

A method to fabricate polyimide aerogels with a covalently bonded network structure, using a combination of aromatic diamines and aromatic dianhydrides cross-linked with TAB is described. These aerogels are potentially useful as high-temperature insulation material for various aerospace applications, including entry, descent, and landing ("EDL") applications, launch vehicles, etc. The formulations with the highest thermal stability and glass transition temperatures were made using PPDA as the diamine. However, these formulations tended to shrink the most during gelation, perhaps because of better packing between polymer chains or lower solubility during polymerization (faster phase separation), leading to higher densities and lower porosity. The least shrinkage was observed in aerogels made using DMBZ as the diamine and BPDA as dianhydride. Although these formulations have the lowest densities and highest surface areas of all the formulations studied, compressive modulus is nearly as high as the PPDA formulations which have double the density. In comparison to previously reported polyimide aerogels cross-linked using OAPS, the lowest density DMBZ formulation cross-linked with TAB has a density about 26% higher, but modulus increases by a factor of 4 and surface areas are also significantly higher for these TAB cross-linked aerogels. This makes these aerogels candidates for multifunctional sandwich structures where a combination of light weight, insulation, high temperature stability and good mechanical integrity are needed. Finally, TAB cross-linked formulations made using ODA or DMBZ as diamine and BPDA as dianhydride can be fabricated into thin, flexible films with good tensile properties, making them potential candidates for insulation for inflatable aerodynamic decelerators for EDL applications, inflatable habitats, or extravehicular activity suits as well as more earth-based applications.

EXAMPLE 3

Figure 22:
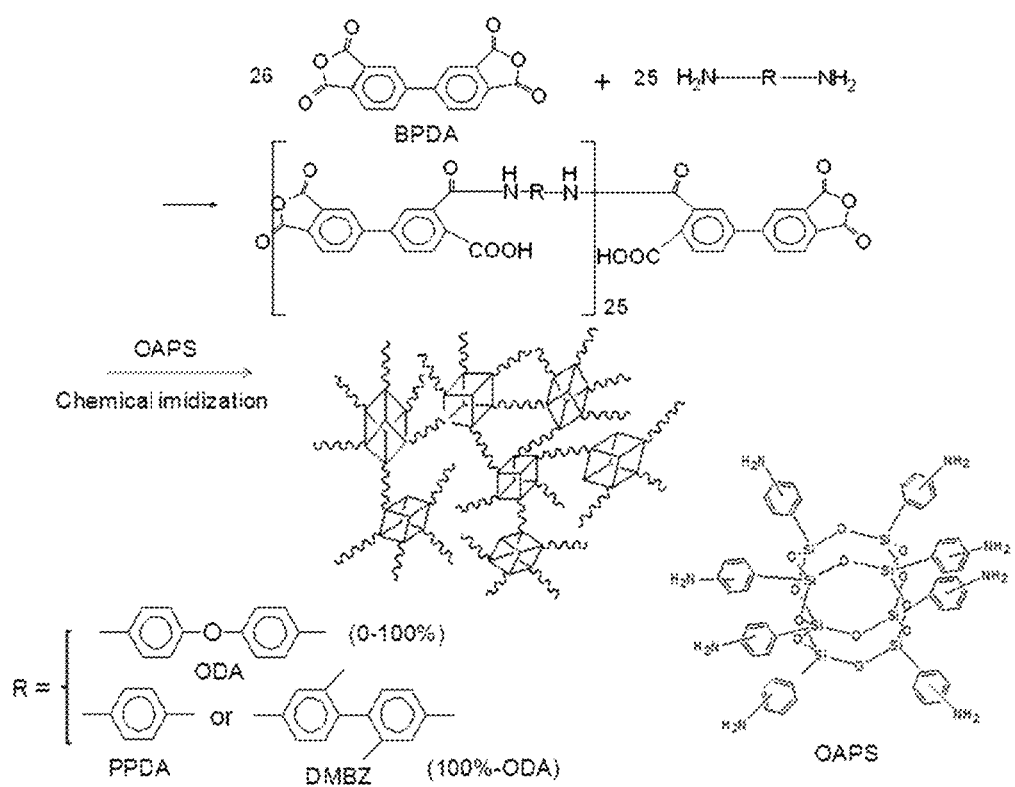
FIG. 22 is a scheme of synthesis of polyimide aerogels cross-linked with OAPS made with ODA and PPDA and/or DMBZ in the backbone, in which DMBZ or PPDA are used to replace up to 100 mol % ODA, yielding random copolymers.

The properties of polyimide aerogels cross-linked with OAPS made with ODA, PPDA and DMBZ in the backbone, as shown in the scheme in FIG. 22, were studied. It is of interest to discern if the observed differences in properties (shrinkage, surface area, mechanical properties) of OAPS versus TAB cross-linked aerogels are due to the different cross-linker or due to different backbone structure or both. In addition, it is of interest to optimize the properties of the aerogel by using ODA in combination with either of the rigid diamines, PPDA or DMBZ. In this regard, DMBZ or PPDA are used to replace up to 100 mol % ODA to optimize the mechanical properties, thermal stability and resistance to moisture of the polyimide aerogels. As shown in the scheme in FIG. 22, polyimide gels are obtained as previously described using chemical imidization at room temperature, using pyridine and acetic anhydride. The polyimide gels are then dried using $CO_2$ supercritical fluid extraction to produce polyimide aerogels. Fabrication of both molded cylinders and highly flexible, thin film polyimide aerogel monoliths are demonstrated. Mechanical properties, including compression and tensile measurements, and thermal properties of the aerogels are discussed and related to morphology and chemical structure.

Experimental Section

Materials. BPDA and ODA were purchased from Chriskev, Inc, (13920 W $108^{th}$ Street, Lenexa, Kans., 66215, USA). DMBZ and PPDA were purchased from Omni Specialty Chemicals, Inc. OAPS as a mixture of isomers (meta:ortho: para=60:30:10) was acquired from Mayaterials, Inc. HPLC grade N-methyl-2-pyrrolidinone (NMP) and pyridine were purchased from Sigma-Aldrich. Anhydrous acetic anhydride was purchased from Fisher Scientific. Dianhydrides were dried at 125° C. in vacuum for 24 h before use. All other reagents were used without further purification.

General. Attenuated total reflectance (ATR) infrared spectroscopy was obtained using a Nicolet Nexus 470 FT-IR spectrometer. Solid $^{13}C$ NMR spectroscopy was carried out with a Bruker Avance-300 spectrometer, using cross-polarization and magic angle spinning at 11 KHz. The solid $^{13}C$ spectra were externally referenced to the carbonyl of glycine (176.1 relative to tetramethylsilane, TMS). Scanning electron microscopy (SEM) micrographs were obtained using a Hitachi S-4700 field emission SEM system after sputter coating the samples with gold. The samples were out-gassed at 80° C. for 8 hours under vacuum before running nitrogen-adsorption porosimetry with an ASAP 2000 surface Area/Pore Distribution analyzer (Micromeritics Instrument Corp.). The skeletal density was measured using a Micromeritics Accupyc 1340 helium pycnometer. Using bulk density ($\rho_b$) and skeletal density ($\rho_s$) measured by helium pycnometry, the percent porosity was calculated using equation 1:

$$\text{porosity} = (1 - \rho_b / \rho_s) \times 100\% \qquad (1)$$

Thermogravimetric analysis (TGA) was performed using a TA model 2950 HiRes instrument. Samples were examined at a temperature ramp rate of 10° C. per minute from room temperature to 750° C. under nitrogen or air.

Preparation of OAPS cross-linked polyimide aerogel monoliths. Polyimide aerogels were prepared as previously described by Guo, H. et al., ACS Appl. Mater. Interfaces 2011, 3, 546-552. Poly(amic acid) oligomer was synthesized in NMP using a molar ratio of dianhydride:total diamine of 26:25, which is formulated to provide oligomers with an average of 25 repeat units terminated with anhydride. The mole percent of rigid diamine in place of ODA ranges from 0 to 100% in this study as shown in Table 2. Since each OAPS contains eight amine groups which can react with the two terminal anhydride groups on the poly(amic acid) oligomers, a ratio of four oligomers to one OAPS was used. The total weight of precursors in solution was formulated to be 10% w/w in all cases. A sample procedure for an oligomer made using 50% DMBZ and 50% ODA is as follows: To a stirred solution of DMBZ (0.443 g, 2.09 mmole) and ODA (0.418 g, 2.09 mmole) in 17 ml NMP was added BPDA (1.278 g, 4.34 mmole). The mixture was stirred until all BPDA was dissolved, and a solution of OAPS (0.0481 g, 0.042 mmole) in 2.145 ml NMP was added. The resulting solution was stirred for 5 minutes, after which acetic anhydride (3.275 ml, 34.7 mmol) and then pyridine (2.81 ml, 34.7 mmol) were added, both representing an eight to one ratio to BPDA. The solution was continually stirred for 10 minutes and then poured into a 20 ml syringe mold (2 cm in diameter), prepared by cutting off the needle end of the syringe and extending the plunger all the way out. The gels, which formed within 30 minutes, were aged in the mold for one day before extraction into fresh NMP to soak for 24 hours to remove acetic acid and pyridine. The solvent within the gels was then gradually exchanged to acetone in 24 hour intervals starting with 75% NMP in acetone, followed by 25% NMP in acetone and, finally, three more times with 100% acetone. The gels were then placed in a 1 L supercritical fluid extraction chamber in acetone, and washed with liquid $CO_2$ at ~100 Bar and ~25° C. in four two-hour cycles. The chamber was then heated to 45° C. and the $CO_2$ was converted into a supercritical state. Gaseous $CO_2$ was slowly vented out at the rate 4.5 m/h from the chamber over three hours. The dry polyimide aerogels produced in this way have a density of 0.095 g/cm$^3$ and porosity of 93.7%. $^{13}$C CPMAS NMR (ppm): 19.6, 124.3, 130.7, 143.9, 155, 165.9. FT-IR (cm$^{-1}$): 1775, 1715, 1596, 1498, 1417, 1370, 1236, 1170, 1112, 1088, 1008, 825, 736.

Procedure to make polyimide aerogel films. The same OAPS cross-linked polyamic acid solution as described above was cast onto a PET carrier, using a 12 in.-wide doctor blade at a speed of 80 cm/min. The gel film was peeled away from the carrier film. Afterward, the films were washed in 24 hour intervals in 75% NMP in acetone, followed by 25% NMP in acetone and finally washed three more times with acetone. Supercritical drying was carried out as described before to give polyimide aerogel thin films.

Mechanical characterization. The specimens were cut and polished to make sure that the top and bottom surfaces were smooth and parallel. Samples were conditioned at room temperature for 48 hours prior to testing. The diameter and length of the specimens were measured before testing. The specimens were tested in accordance with ASTM D695-10 with the sample sizes nominally 1.5-1.8 cm in diameter and 3 cm in length (close to the 1:2 ratio of diameter-to-length ratio prescribed for the testing of polymer foams). The samples were tested between a pair of compression plates on a Model 4505 Instron load frame using the Series IX data acquisition software. All testing was carried out under nominal room conditions, and at a crosshead speed of 0.05 in./min as dictated by the ASTM guidelines. The aerogels were crushed to 75% strain or the full capacity of the load cell (whichever occurred first). The Young's modulus was taken as the initial linear portion of the slope of the stress-strain curve.

The thin films were cut into 5 mm×33 mm strips and tested at a extension speed 2 mm/min and 100N load using a Model 5567 Instron Tensile Test Machine with Bluehill software. A film strip was fixed on a rectangular cardboard frame by adhering the two ends with cellophane tape. The center part of the cardboard was open to expose the test area of the sample. This setup was used to support and align the flexible film to be straight for installation on the machine clip. The edges of the cardboard frame were cut before testing. The tensile modulus was taken as the initial linear portion of the slope of the stress-strain curve.

Statistical analysis. Experimental design and analysis was conducted using Design Expert Version 8.1, available from Stat-Ease, Inc., Minneapolis, Minn. Multiple linear regression analysis was used to derive empirical models to describe the effect of each of the process variables studied on measured properties. A full quadratic model including all main effects, second-order effects, and all two way interactions was entertained, and continuous variables were orthogonalized (transformed to −1 to +1 scale) before analysis. Terms deemed to not be significant in the model (<90% confidence) were eliminated one at a time using a backward stepwise regression technique.

Results and Discussion

Process variables and properties of the polyimide aerogels prepared in the study are summarized in Table 2. Polyimide aerogels were made using 10 w/w % solutions of precursors in NMP, with equivalent ratios of dianhydride to total diamines of 26:25 upon mixing. Amber colored poly(amic acid) oligomers with terminal anhydride groups were formed in solution. The terminal anhydride groups reacted with the amines of OAPS, after which pyridine (to catalyze imidization) and acetic anhydride (to scavenge water by-product of condensation) were added to the solution (pH of the solution is ~6.0). The resulting polyimide aerogels differ slightly in color, depending on the formulation. For example, aerogels made using PPDA as the diamine are orange, while those made from DMBZ are light yellow and those made from ODA are slightly darker yellow. To some extent, the differences in color reflect different densities produced using the different diamines: PPDA, having the highest density, has the most intense color, followed by ODA, then DMBZ. OAPS cross-linked aerogels made from 100% PPDA gel the fastest, with 10% w/w solutions having a gelation time of ~5 min. Other formulations gel within 30 min. Thin films of OAPS cross-linked polyimide aerogels were fabricated as previously described. The thickness of the film is determined by the gap between the carrier film and the doctor blade, the solution viscosity, the casting speed, and the head pressure, as well as the shrinkage. Solutions made using PPDA were the most viscous, while those made using DMBZ and/or ODA were slightly less viscous. With a casting speed of 80 cm/min and a 12-in.-wide doctor blade with a gap of 1.09 mm, the films have a thickness of nominally 0.3-0.7 mm.

Figure 23:
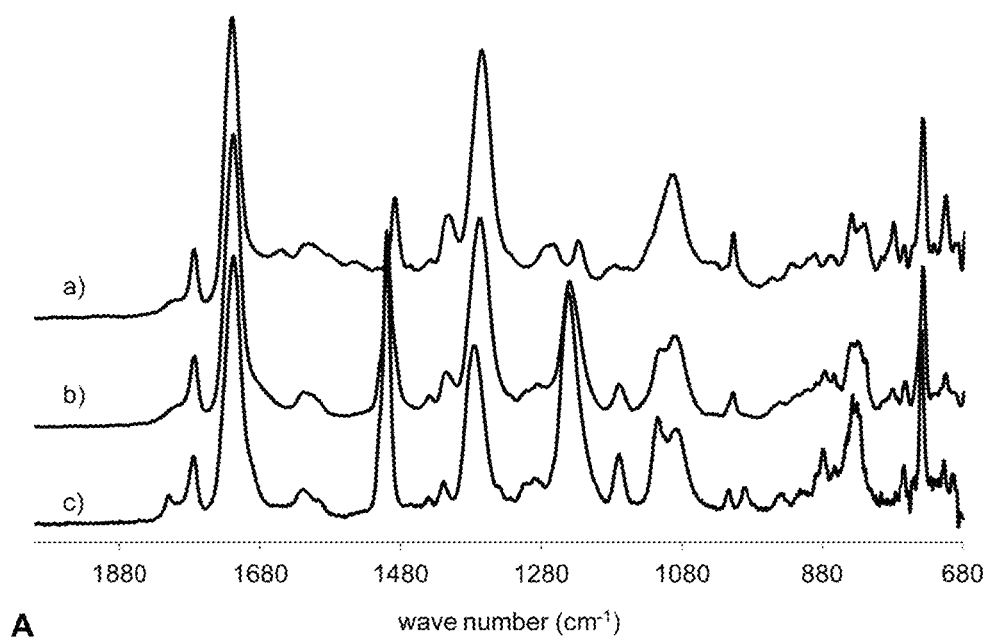
FIG. 23 shows (A) FT-IR spectra of polyimide aerogels made with (a) 100% DMBZ, (b) 50% DMBZ/50% ODA and (c) 100% ODA; and (B)$^{13}$C solid-state NMR spectra of polyimide aerogels made with (a) 100% DMBZ, (b) 50% DMBZ/50% ODA and (c) 100% ODA.
Figure 23:
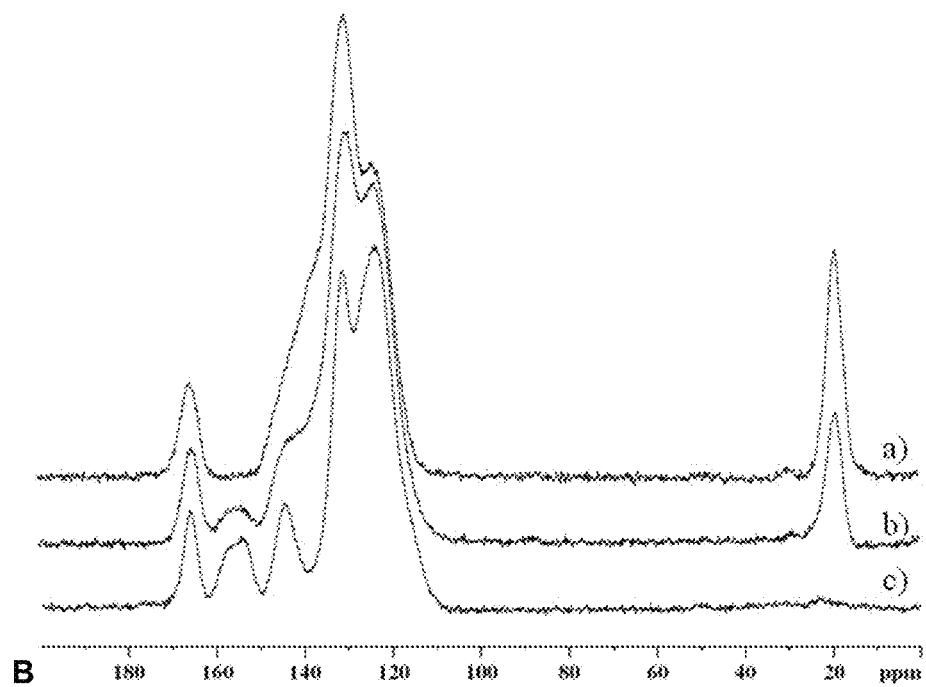

FTIR spectra, as seen in FIG. 23, of all of the aerogels in the study contain characteristic bands for polyimides, including 1370 cm$^{-1}$ (ν imide C-N), 1715 cm$^{-1}$ (symmetric ν imide C=O) and 1775 cm$^{-1}$ (asymmetric ν imide C=O). A band at ~1860 cm$^{-1}$, which would indicate the existence of unreacted anhydride, is not observed. In addition, bands at ~1660 cm$^{-1}$ (ν amic acid C=O) and ~1535 cm$^{-1}$ (ν amide C-N) are absent, further indicating that imidization is complete. Bands at ~1807 cm$^{-1}$ and 980 cm$^{-1}$ expected for the isoimide structure also are not observed in the FTIR spectra. The bands at 1112 cm$^{-1}$ and 1088 cm$^{-1}$ are attributed to the vibration of Si—O—Si from OAPS.

The $^{13}$C NMR spectra, as also seen in FIG. 23, from solid samples of polyimide aerogels all contain an imide carbonyl peak at approximately 165 ppm, and aromatic peaks between 115 ppm and 140 ppm. Polyimide aerogels made using ODA have a peak at 153 ppm corresponding to the aromatic ether carbon. Increasing the fraction of ODA increases the relative intensity of the 153 ppm peak. NMR spectra of polyimide aerogels made with DMBZ have a characteristic aliphatic peak at 19 ppm for the pendant methyl groups, which increases with increasing DMBZ content.

Figure 24:
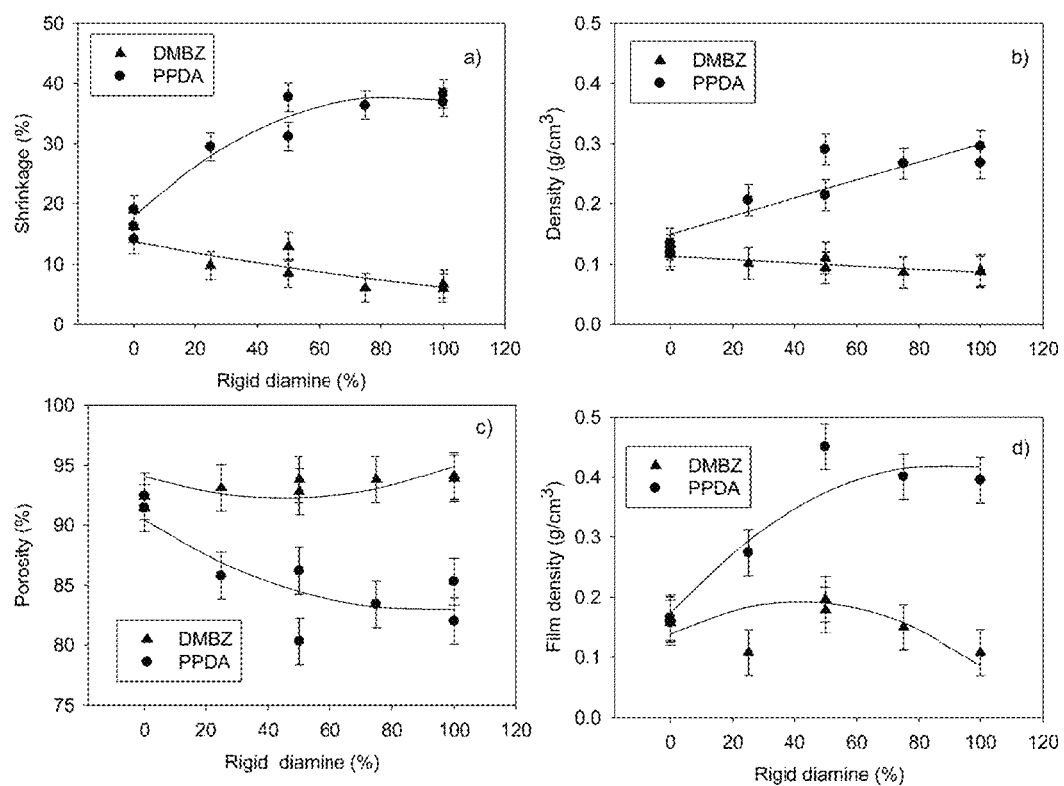
FIG. 24 shows graphs of (a) shrinkage, (b) density of polyimide aerogel cylinders, (c) porosity of the polyimide aerogels, and (d) density of the polyimide aerogel films made using ODA, PPDA, and DMBZ. Rigid diamine=% DMBZ or PPDA. Error bars represent one standard deviation from fitted models.

As seen in FIG. 24a, the diamine combination has a strong influence on the shrinkage (standard deviation=2.33%, $R^2=0.98$) occurring during fabrication of the aerogels. Overall, OAPS cross-linked polyimide aerogels exhibit slightly lower shrinkage than those using TAB as cross-linker, resulting in slightly lower densities and higher porosities. However, trends due to diamine are the same whether OAPS or TAB is the cross-link, with the most shrinkage exhibited in aerogels made using PPDA and the least shrinkage with DMBZ. Since this shrinkage occurs mostly during gelation, this difference is most likely due to a combination of solvent interactions, chain rigidity and chain packing. PPDA and DMBZ are both rigid diamines, but DMBZ with a 75° torsional angle between phenyl rings prevents polymer chains from packing close together. As shown in FIG. 24a, polyimide aerogels made using ODA shrink about 15% during processing, while replacing ODA with increasing amounts of DMBZ slightly reduces shrinkage. Increasing concentration of PPDA in the aerogels increases shrinkage, with aerogels containing at least 50% PPDA shrinking more than 30%. As shown in FIG. 24b, densities of the polyimide aerogels (standard deviation=0.026 g/cm$^3$, $R^2=0.92$) follow the same trends as shrinkage, with densities decreasing slightly with increasing DMBZ fraction, and greatly increasing with increasing PPDA fraction. As expected, porosity (standard deviation=1.95%, $R^2=0.89$), shown in FIG. 24c, increases as density and shrinkage decrease, with aerogels derived from DMBZ being the most porous (up to 94%). As seen in FIG. 24d, the density of the films (standard deviation=0.038 g/cm$^3$, $R^2=0.93$) are higher than those of the cylindrical samples, which may be due to more solvent evaporation from the larger exposed surface area of the gel films during the casting process.

Figure 25:
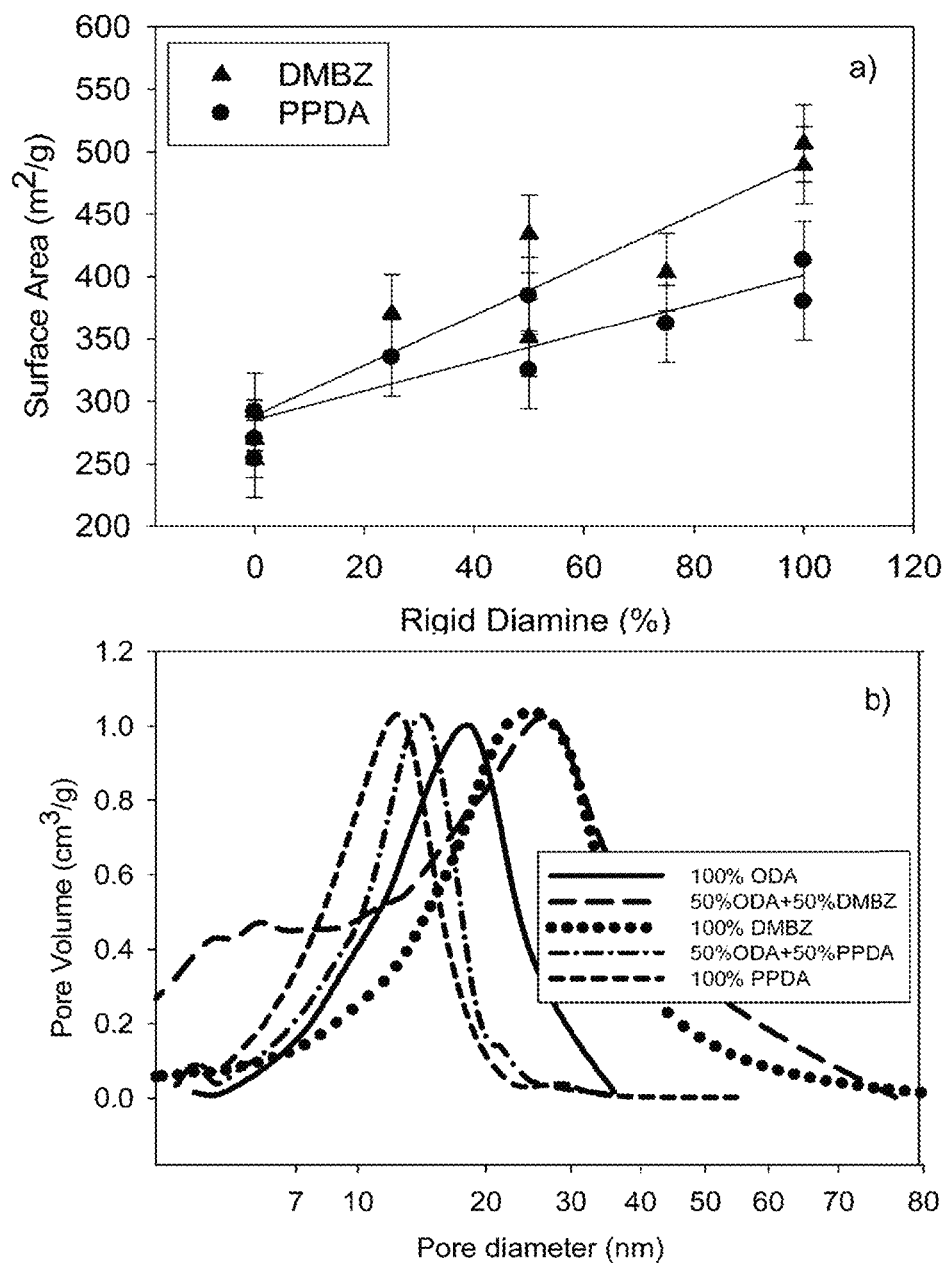
FIG. 25 shows (a) surface area of the polyimide aerogels made with varying amounts of ODA with PPDA or DMBZ, and (b) relative pore volume versus pore diameter of the polyimide aerogels with 100% ODA, 50% DMBZ+50% ODA, 100% DMBZ, 50% PPDA+50% ODA and 100% PPDA. Error bars represent one standard deviation from fitted models.

The surface areas and pore volume of the monoliths were measured by nitrogen sorption using the Branuaer-Emmet-Teller (BET) method, in accordance with Brunauer, S. et al., J. Am. Chem. Soc. 1938, 60, 309. BET surface areas of the aerogels (standard deviation=30.99 m$^2$/g, $R^2=0.86$) ranged from 250 m$^2$/g to over 500 m$^2$/g, depending on diamine used, and were similar to trends previously observed with TAB as cross-link. As seen in FIG. 25a, polyimide aerogels made using just ODA have the lowest surface area. As also seen in FIG. 25a, replacing ODA with either PPDA or DMBZ increases surface area over the entire range, with DMBZ increasing the surface area more than PPDA. The nitrogen sorption isotherms for all of the polyimide aerogels are IUPAC type IV curves with an H1 hysteresis loop, indicating that the monoliths consist predominately of three dimensional (3D) continuous mesopores/macropores, in accordance with Barton, T. J. et al., Chem. Mater. 1999, 11, 2633-2656. A graph of relative pore volume versus pore diameter for selected formulations is shown in FIG. 25b. According to the IUPAC definition, pores are classified by the pore diameter, with micropores having diameters less than 2 nm, mesopores having diameters between 2 and 50 nm, and macropores having pore diameters larger than 50 nm. From FIG. 25b, it can be seen that the aerogels have pore diameters in the range of mesopores to macropores, with the distribution peaking at ~14-30 nm. Aerogels made using only PPDA have the smallest pore diameter, most likely because they have the highest shrinkage, while those made using only DMBZ have the largest pore diameters and the smallest shrinkage. Aerogels made using only ODA have a pore size distribution that falls between those made with PPDA and DMBZ.

Figure 26:
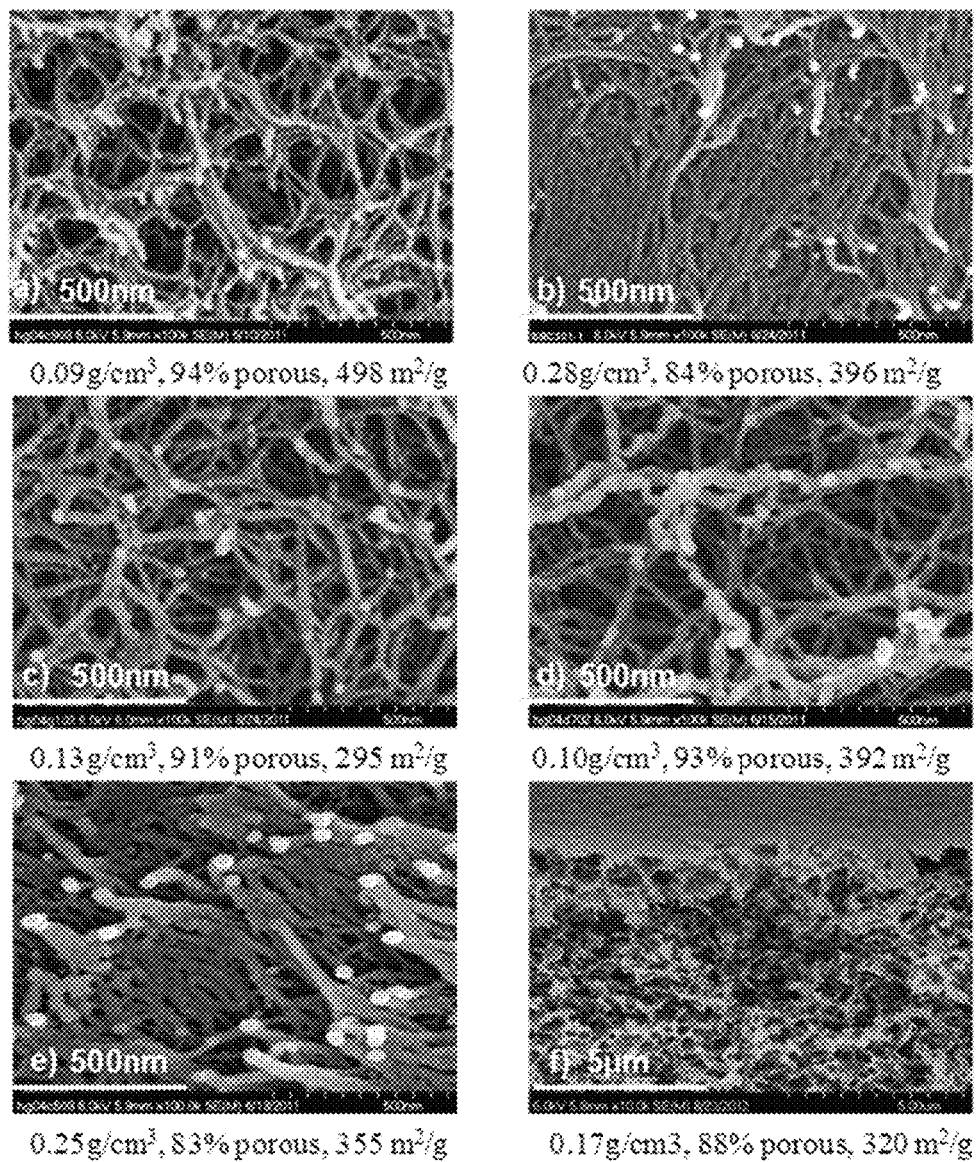
FIG. 26 shows FESEM of the polyimide aerogels with (a) 100% DMBZ, (b) 100% PPDA, (c) 100% ODA, (d) 50% DMBZ+50% ODA, (e) 50% PPDA+50% ODA, and (f) cross section of aerogel film with 50% DMBZ+50% ODA. Related density, porosity, and surface area are listed under the images.

Field emission scanning electron microscopy (FESEM) micrographs of the selected polyimide aerogel formulations made in a cylinder form are shown in FIG. 26. Unlike silica aerogels, the polyimide aerogels consist of a 3D network of polymer nanofibers tangled together, with fiber diameters ranging from 15 nm to 50 nm. This arrangement of nanofibers most likely forms during polymerization and subsequent gelation, with influence from solvent interaction. Aerogels made using PPDA as the diamine have densely packed strands (FIG. 26b). This may be due to the polyimide oligomers having greater chain rigidity, high planarity, and shorter chain length between cross-links, leading to greater shrinkage during processing. This is in contrast to aerogels made using either DMBZ as the diamine (FIG. 26a), ODA as the diamine (FIG. 26c), or a combination (FIG. 26d), which have more open porosity around the fiber strands. Aerogels made with 50/50 mixtures of PPDA and ODA (FIG. 26e) resemble the structure of the 100% PPDA aerogels, with similar shrinkage and density. FIG. 26f shows the cross-section of a polyimide aerogel film made using a 50/50 mixture of DMBZ and ODA. Because of the solvent evaporation in the casting process, the surface of the film appears denser, but the interior of the film has a fiberlike structure similar to the thicker cylindrical samples.

Figure 27:
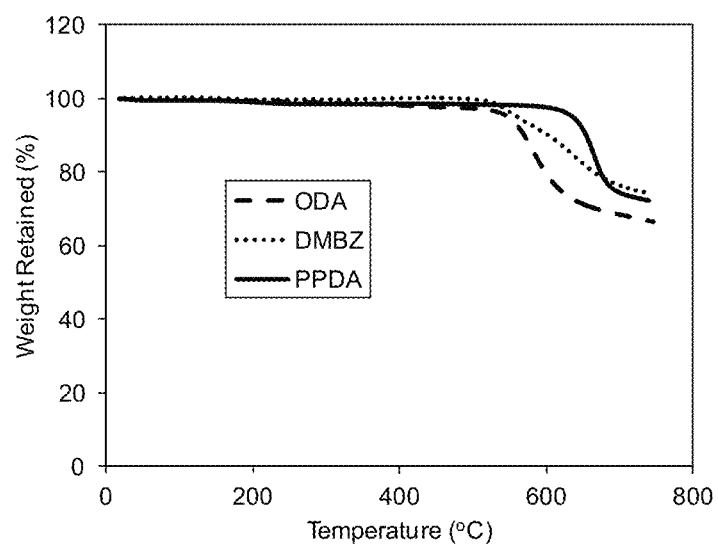
FIG. 27 shows TGA curve in $N_2$ of the polyimide aerogels made using DMBZ, PPDA and ODA.

Thermogravimetric analysis (TGA) of the OAPS cross-linked polyimide aerogels was performed in nitrogen from room temperature to 750° C. Graphs of selected TGA curves are shown in FIG. 27. For all formulations, little weight loss occurs until the onset of decomposition temperature at 525-625° C., indicating that imidization is complete and NMP is removed completely by solvent exchange to acetone and supercritical drying. As with TAB cross-linked aerogels, the onset of decomposition temperature varies with the diamine used, with the highest onset of decomposition seen for the formulations made using PPDA. Formulations made using DMBZ have the lowest decomposition temperatures, because of the loss of the pendant methyl groups from DMBZ. All of the formulations have a char yield in nitrogen above 70%.

Figure 28:
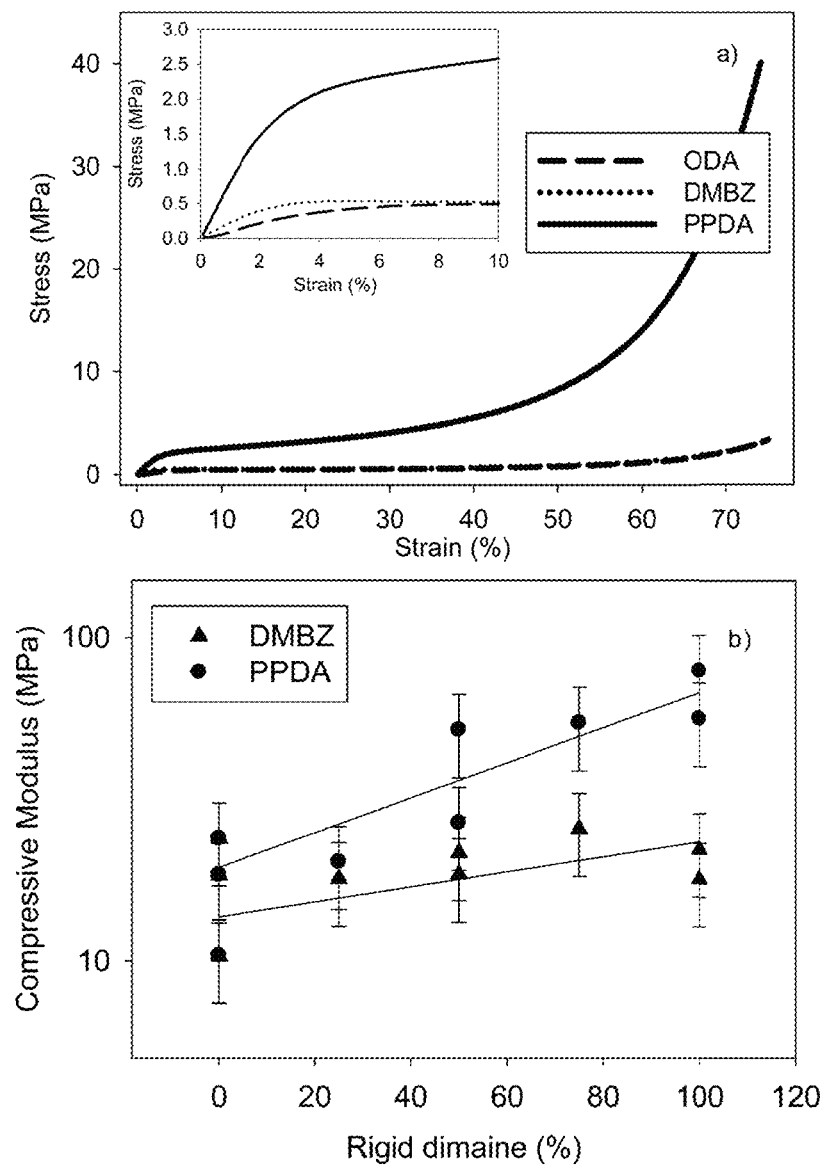
FIG. 28 shows graphs of (a) stress-strain curves of polyimide aerogels made using DMBZ, PPDA, and ODA; and (b) Young's modulus for polyimide aerogels made using ODA with varying amounts of DMBZ or PPDA. Error bars represent one standard deviation from fitted models.

Compression tests were performed on all aerogel formulations in the study. Young's modulus (standard deviation (log)= 0.11, $R^2=0.85$) of the aerogels was measured as the initial slope of the stress-strain curves and is plotted in FIG. 28. Similar to TAB cross-linked polyimide aerogels, OAPS cross-linked polyimide aerogels made using PPDA as the diamine exhibit higher modulus than those made with DMBZ. As seen in FIG. 28, modulus of the polyimide aerogel increases with increasing fraction of rigid diamine. Generally in aerogels, the modulus increases as density increases, as shown for example by R. W. Pekala et al., Mater. Res. Soc. Symp. Proc., 1991, 207, 197. Aerogels made using PPDA follow this same trend, with modulus and density both increasing with increasing PPDA content. Surprisingly, Young's modulus of aerogels made using DMBZ increases slightly with increasing DMBZ content, while the density actually decreases slightly. This could be due to slight differences in the cure state, although no differences among the formulations were detected. Most likely, the increase in modulus is due to the greater rigidity of the polymer backbone. In any case, it is possible to fabricate a polyimide aerogel with both low density and high modulus by increasing the ratio of DMBZ in the aerogel structure.

Figure 29:
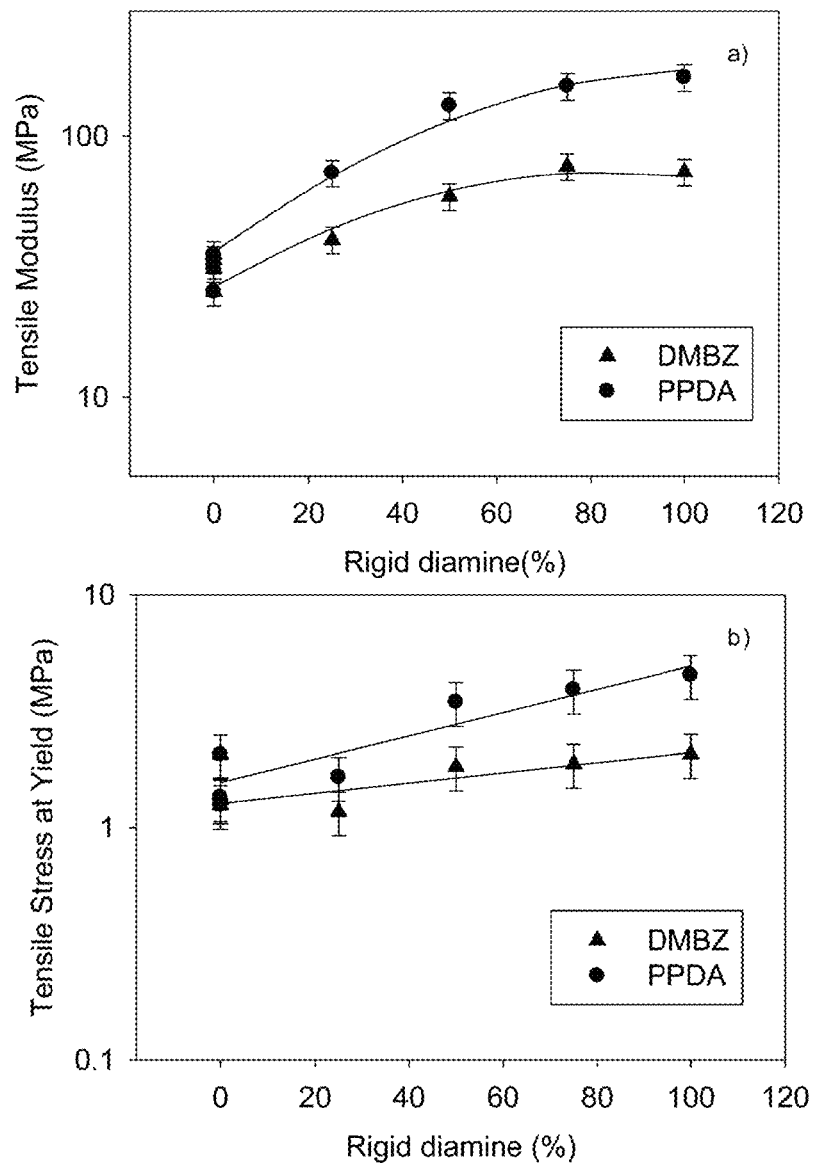
FIG. 29 shows graphs of (a) tensile modulus and (b) tensile stress at break of polyimide aerogel films made using ODA with varying amounts of DMBZ or PPDA. Error bars represent one standard deviation from fitted models.

Polyimide aerogel thin films were made using ODA with varying amounts of DMBZ or PPDA as described above. The thickness of the film is determined by the casting doctor blade gap, the solution viscosity, casting speed and head pressure, as well as shrinkage. With a casting speed of 80 cm/min, a 12 in.-wide doctor blade with a gap of 1.09 mm, the final film has a thickness of nominally 0.4-0.7 mm. Graphs of tensile modulus and tensile stress at break, of the polyimide aerogel films with DMBZ or PPDA varying from 0% to 100%, are shown in FIG. 29. Similar to compression, tensile modulus of the aerogel films slightly increases with increasing DMBZ content and greatly increases with increasing PPDA content. The latter is again consistent with the expected increase in density due to higher shrinkage with increasing PPDA content.

Figure 30:
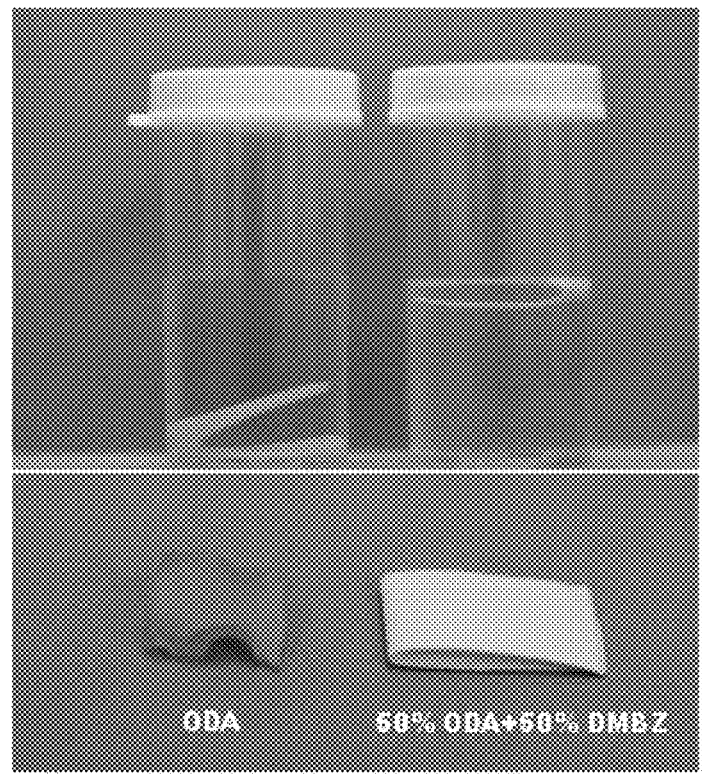
FIG. 30 shows polyimide aerogel thin film made using 100% ODA (left) and 50% DMBZ+50% ODA (right) shown in water (top) and after air drying (bottom).

Films from all formulations were soaked in water for 24 hours and later dried in air to test moisture resistance. As seen in FIG. 30, samples made using 100% ODA absorbed water into the pores and sank to the bottom after a short time. This was also true for samples made with 75% ODA and 25% DMBZ, or any amount of PPDA. However, aerogels made with at least 50% DMBZ were water-resistant, as shown in FIG. 29, and remained floating on the surface of the water indefinitely. Those aerogels that absorbed water tended to shrivel upon air drying. The aerogels made with at least 50% DMBZ were unchanged. Water contact angle measurements of these polyimide aerogel films made with 50%-100% DMBZ ranged from 85° to 90°. It is surprising that the aerogels made using PPDA are not moisture-resistant, since the phenyl ring is also hydrophobic. This may be due to the ratio and distribution of hydrophobic and hydrophilic groups in the polymer backbones. Hence, the smaller size and planar nature of the hydrophobic phenyls in PPDA oligomers may not be enough to shield the hydrophilic imide rings. Films fabricated with 100% DMBZ are the most brittle among all the films, while formulations made using at least 50% ODA were quite flexible. As seen in FIG. 30, thin films of aerogels made using 50% DMBZ are flexible enough to bend back nearly 180° without cracking or flaking and maintain this flexibility after being soaked in water and dried in air.

Conclusions

A series of polyimide aerogels were synthesized using BPDA and combinations of different diamines (two rigid and one flexible), and cross-linked using octa-aminophenyl decorated polysilsesquioxane, OAPS. The resulting aerogels vary in density, shrinkage, porosity, surface area, and modulus, depending on the types of diamine, and the proportions of rigid diamine to flexible diamine used. Using OAPS as the cross-link leads to lower shrinkage and lower density, compared to aerogels using TAB as the cross-link. However, similar to TAB cross-linked aerogels, aerogels made using DMBZ have lower density but also higher porosity and surface area. With the onset of decomposition 500° C. and higher, all formulations are quite stable and also exhibit high char yield in nitrogen. Increasing the rigid diamine fraction results in increased tensile and compressive modulus of the aerogels. It is interesting to note that, for aerogels made with increasing DMBZ fraction, this increase in modulus occurs even though the density is decreasing. Using at least 50% DMBZ in the formulations also results in good water resistance in the polyimide aerogels, which is a key attribute for employing these aerogels as insulation in many instances. Thus, a formulation made using 50% DMBZ and 50% ODA results in the best combination of moisture resistance, flexibility, low density, good thermal stability, and excellent mechanical properties.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

TABLE 1

Formulations and properties of polyimide aerogels cross-linked with TAB.

| sample | no. of repeats, n | diamine | dianhydride | density (g/cm$^3$) | porosity (%) | shrinkage (%) | BET surface area (m$^2$/g) | modulus (MPa) | onset of decomposition (° C.) | T$_g$ (° C.) |
|---|---|---|---|---|---|---|---|---|---|---|
| 1 | 15 | ODA | BPDA | 0.206 | 88.0 | 24.5 | 377 | 15.9 | 558 | 274 |
| 2 | 20 | ODA | BPDA | 0.194 | 86.7 | 22.4 | 401 | 11.1 | 557 | 267 |
| 3 | 25 | ODA | BPDA | 0.194 | 88.1 | 22.8 | 412 | 12.7 | 548 | 272 |
| 4 | 15 | ODA | BTDA | 0.144 | 90.6 | 20.3 | 469 | 1.0 | 552 | 257 |
| 5 | 20 | ODA | BTDA | 0.167 | 89.5 | 20.3 | 499 | 1.5 | 567 | 271 |
| 6 | 25 | ODA | BTDA | 0.157 | 89.4 | 19.3 | 477 | 0.9 | 565 | 268 |
| 7 | 15 | ODA | BPDA | 0.181 | 90.1 | 21.2 | 425 | 16.9 | 555 | 255 |
| 8 | 20 | ODA | BPDA | 0.196 | 86.2 | 22.1 | 377 | 5.5 | 552 | 272 |
| 9 | 25 | ODA | BPDA | 0.180 | 87.5 | 21.1 | 362 | 12.2 | 550 | 267 |
| 10 | 15 | ODA | BTDA | 0.192 | 87.0 | 23.3 | — | 0.9 | 560 | 278 |
| 11 | 20 | ODA | BTDA | 0.207 | 86.0 | 25.0 | 503 | 2.3 | 550 | 282 |
| 12 | 15 | PPDA | BPDA | 0.318 | 79.8 | 47.8 | 335 | 30.1 | 600 | 346 |
| 13 | 20 | PPDA | BPDA | 0.333 | 77.6 | 47.9 | 329 | 46.1 | 609 | 343 |
| 14 | 25 | PPDA | BPDA | 0.324 | 79.5 | 47.1 | 255 | 19.1 | 593 | — |
| 15 | 15 | PPDA | BTDA | 0.231 | 84.9 | 41.4 | 358 | 27.6 | 566 | 337 |
| 16 | 20 | PPDA | BTDA | 0.210 | 86.2 | 39.7 | 498 | 19.2 | 571 | 321 |
| 17 | 25 | PPDA | BTDA | 0.219 | 85.0 | 40.2 | 461 | 29.2 | 570 | 325 |
| 18 | 30 | DMBZ | BPDA | 0.146 | 89.7 | 19.0 | 314 | 19.1 | 517 | 286 |
| 19 | 30 | DMBZ | BTDA | 0.195 | 87.1 | 27.5 | 442 | 58.4 | 463 | — |
| 20 | 30 | DMBZ | BPDA | 0.131 | 91.6 | 17.1 | 472 | 20.1 | 511 | 293 |
| 21 | 30 | DMBZ | BTDA | 0.181 | 87.6 | 30.1 | 340 | 102 | 470 | — |
| 22 | 30 | ODA | BPDA | 0.207 | 86.3 | 28.7 | 202 | 13.9 | 577 | 292 |

TABLE 2

Process variables and properties of polyimide aerogels prepared in the study. Note that ODA fraction is 100% - rigid diamine %.

| rigid diamine, % | rigid diamine type | density (g/cm³) | film density (g/cm³) | surface area (m²/g) | porosity (%) | shrinkage (%) | Young's modulus (MPa) | tensile modulus (MPa) | tensile stress at break (MPa) |
|---|---|---|---|---|---|---|---|---|---|
| 100 | PPDA | 0.296 | 0.395 | 380 | 82.0 | 38.3 | 78.7 | 167.5 | 4.5 |
| 75 | PPDA | 0.267 | 0.400 | 362 | 83.4 | 36.4 | 54.3 | 155.0 | 3.9 |
| 50 | PPDA | 0.291 | 0.451 | 325 | 80.3 | 37.7 | 51.7 | 130.9 | 3.5 |
| 25 | PPDA | 0.206 | 0.274 | 335 | 85.8 | 29.5 | 20.2 | 72.2 | 1.6 |
| 0 | PPDA | 0.122 | 0.163 | 254 | 91.4 | 16.2 | 18.4 | 35.2 | 2.1 |
| 100 | DMBZ | 0.086 | 0.108 | 507 | 94.1 | 6.0 | 17.9 | 72.8 | 2.1 |
| 75 | DMBZ | 0.086 | 0.150 | 404 | 93.8 | 6.1 | 25.6 | 76.6 | 1.9 |
| 50 | DMBZ | 0.094 | 0.197 | 434 | 93.8 | 8.5 | 21.5 | 58.6 | 3.4 |
| 25 | DMBZ | 0.101 | 0.132 | 371 | 93.1 | 9.8 | 18.0 | 40.0 | 1.2 |
| 0 | DMBZ | 0.116 | 0.162 | 270 | 92.4 | 14.1 | 10.4 | 25.4 | 1.4 |
| 100 | PPDA | 0.268 | | 413 | 85.3 | 36.9 | 56.0 | | |
| 50 | PPDA | 0.214 | | 385 | 86.2 | 31.2 | 26.7 | | |
| 0 | PPDA | 0.133 | 0.166 | 292 | 91.4 | 19.0 | 23.9 | 33.7 | 1.2 |
| 100 | DMBZ | 0.089 | | 489 | 93.9 | 6.7 | 22.1 | | |
| 50 | DMBZ | 0.110 | 0.179 | 351 | 92.8 | 12.9 | 18.5 | 54.8 | 1.8 |
| 0 | DMBZ | 0.153 | 0.157 | 366 | 90.7 | 19.7 | 19.4 | 31.2 | 1.3 |

What is claimed is:

1. A porous cross-linked polyimide network comprising an anhydride end-capped polyamic acid oligomer, wherein the oligomer (i) comprises a repeating unit of a dianhydride and a diamine and terminal anhydride groups, (ii) has an average degree of polymerization of 10 to 50, (iii) has been cross-linked via a cross-linking agent, comprising three or more amine groups, at a balanced stoichiometry of the amine groups to the terminal anhydride groups, and (iv) has been chemically imidized to yield the porous cross-linked polyimide network.

2. The network of claim 1, wherein the dianhydride is selected from the group consisting of benzophenone-3,3',4,4'-tetracarboxylic dianhydride and biphenyl-3,3',4,4'-tetracarboxylic dianhydride.

3. The network of claim 1, wherein the diamine is selected from the group consisting of 3,4-oxydianiline, 4,4'-oxydianiline, p-phenylene diamine, 2,2'-dimethylbenzidine, bisaniline-p-xylidene, 4,4'-bis(4-aminophenoxy)biphenyl, and 2,2'-bis[4-(4-aminophenoxyl)phenyl]propane.

4. The network of claim 1, wherein the diamine comprises (i) 4,4'-oxydianiline and (ii) p-phenylene diamine or 2,2'-dimethylbenzidine.

5. The network of claim 1, wherein the average degree of polymerization is 20 to 30.

6. The network of claim 1, wherein the cross-linking agent is selected from the group consisting of a triamine, an aliphatic amine comprising three or more amines, an aliphatic triamine, an aromatic amine comprising three or more amine groups, an aromatic triamine, 1,3,5-tri(aminophenoxy)benzene, a silica cage structure decorated with three or more amines, octa(aminophenyl)silsesquioxane, octa(aminophenyl)silsesquioxane as a mixture of isomers having the ratio meta:ortho:para of 60:30:10, and para-octa(aminophenyl) silsesquioxane.

7. The network of claim 1, wherein the oligomer has been chemically imidized to completion.

8. A wet gel comprising the network of claim 1.

9. An aerogel comprising the network of claim 1.

10. An aerogel comprising the network of claim 1, wherein the aerogel was obtained by supercritical fluid extraction.

11. An aerogel comprising the network of claim 1, wherein the aerogel has a density of 0.10 to 0.333 g/cm³.

12. An aerogel comprising the network of claim 1, wherein the aerogel has a porosity of 80 to 95%.

13. An aerogel comprising the network of claim 1, wherein the aerogel has a peak pore diameter of 5 to 60 nm.

14. An aerogel comprising the network of claim 1, wherein the aerogel has a surface area of 200 to 600 m²/g.

15. An aerogel comprising the network of claim 1, wherein the aerogel has a thermal conductivity of 13 to 16 mw/(m-K) at room temperature and 760 Torr.

16. An aerogel comprising the network of claim 1, wherein the aerogel has a Young's modulus of 0.9 to 102 MPa.

17. An aerogel comprising the network of claim 1, wherein the aerogel has a higher Young's modulus than a polymer reinforced silica aerogel of similar density.

18. An aerogel comprising the network of claim 1, wherein the aerogel has a glass transition temperature of at least 270° C. and an onset of decomposition of at least 460° C.

19. An aerogel comprising the network of claim 1, wherein the weight loss of the aerogel following heating of the network at 400° C. for 24 hours is less than 5%.

20. A monolith comprising the network of claim 1.

21. A monolith comprising the network of claim 1, wherein the monolith is 2 to 5 times stronger than a monolith of a polymer reinforced silica aerogel of similar density.

22. A thin film comprising the network of claim 1.

23. A thin film comprising the network of claim 1, wherein the average degree of polymerization is 20 to 30.

24. A thin film comprising the network of claim 1, wherein the thin film has sufficient flexibility to be rolled or folded and then recover completely without cracking or flaking.

25. A thin film comprising the network of claim 1, wherein the thin film has a tensile strength of 4-9 MPa.

26. A coating comprising the network of claim 1.

27. A matting comprising the network of claim 1.

28. A method of making a porous cross-linked polyimide network comprising:
   (i) polymerizing a dianhydride and a diamine in a solution to form an anhydride end-capped polyamic acid oligomer comprising terminal anhydrides and having an average degree of polymerization of 10 to 50;
   (ii) cross-linking the oligomer with a cross-linking agent, comprising three or more amine groups, at a balanced stoichiometry of the amine groups to the terminal anhydrides; and (iii) mixing an imidization catalyst into the solution, before phase separation occurs in the solution, to chemically imidize the cross-linked oligomer to form the network.

29. The method of claim 28, wherein the dianhydride is selected from the group consisting of benzophenone-3,3',4,4'-tetracarboxylic dianhydride and biphenyl-3,3',4,4'-tetracarboxylic dianhydride.

30. The method of claim 28, wherein the diamine is selected from the group consisting of 3,4-oxydianiline, 4,4'-oxydianiline, p-phenylene diamine, 2,2'-dimethylbenzidine, bisaniline-p-xylidene, 4,4'-bis(4-aminophenoxy)biphenyl, and 2,2'-bis[4-(4-aminophenoxyl)phenyl]propane.

31. The method of claim 28, wherein the diamine comprises (i) 4,4'-oxydianiline and (ii) p-phenylene diamine or 2,2'-dimethylbenzidine.

32. The method of claim 28, wherein the average degree of polymerization is 20 to 30.

33. The method of claim 28, wherein the cross-linking agent is selected from the group consisting of a triamine, an aliphatic amine comprising three or more amines, an aliphatic triamine, an aromatic amine comprising three or more amine groups, an aromatic triamine, 1,3,5-tri(aminophenoxy)benzene, a silica cage structure decorated with three or more amines, octa(aminophenyl)silsesquioxane, octa(aminophenyl)silsesquioxane as a mixture of isomers having the ratio meta:ortho:para of 60:30:10, and para-octa(aminophenyl) silsesquioxane.

34. The method of claim 28, wherein the cross-linked oligomer has been chemically imidized to completion.

35. The method of claim 28, wherein the imidization catalyst is selected from the group consisting of 1,4-diazabicyclo[2.2.2]-octane, triethylamine, and pyridine.

36. The method of claim 28, wherein the mixing results in a homogeneous distribution of the imidization catalyst in the solution.

37. The method of claim 28, wherein the sum of the concentrations of the dianhydride, the diamine, and the cross-linking agent dissolved into the solution is 5 to 20 w/w % of the solution.

38. The method of claim 28, wherein the solution comprises a solvent selected from the group consisting of N-methyl-2-pyrrolidinone, dimethylformamide, and dimethylacetamide.

39. A porous cross-linked polyimide network formed by the method of claim 28.

* * * * *

UNITED STATES PATENT AND TRADEMARK OFFICE
CERTIFICATE OF CORRECTION

PATENT NO. : 9,109,088 B2
APPLICATION NO. : 13/756855
DATED : August 18, 2015
INVENTOR(S) : Mary Ann B. Meador and Haiquan Guo Page 1 of 1

It is certified that error appears in the above-identified patent and that said Letters Patent is hereby corrected as shown below:

Specification

At Col. 14, Line 33 - Replace "A)" with --%)--

Signed and Sealed this
Twenty-first Day of June, 2016

Michelle K. Lee
*Director of the United States Patent and Trademark Office*